(12) United States Patent
Borenstein et al.

(10) Patent No.: US 12,440,838 B2
(45) Date of Patent: Oct. 14, 2025

(54) MULTIWELL DYNAMIC MODEL FOR A TUMOR-IMMUNE MICROENVIRONMENT

(71) Applicant: The Charles Stark Draper Laboratory Inc., Cambridge, MA (US)

(72) Inventors: Jeffrey Borenstein, Newton, MA (US); Nathan Moore, Canton, MA (US); Daniel Doty, Arlington, MA (US); Timothy Haggerty, Concord, MA (US); Joseph Charest, Jamaica Plain, MA (US); Alla Gimbel, Medford, MA (US); Vienna Mott, Cambridge, MA (US); Brett Isenberg, Newton, MA (US); Hesham Azizgolshani, Belmont, MA (US); Brian Cain, Cambridge, MA (US); Mark Mescher, West Newton, MA (US)

(73) Assignee: The Charles Stark Draper Laboratory Inc., Cambridge, MA (US)

( * ) Notice: Subject to any disclaimer, the term of this patent is extended or adjusted under 35 U.S.C. 154(b) by 1352 days.

(21) Appl. No.: 17/108,475

(22) Filed: Dec. 1, 2020

(65) Prior Publication Data
US 2021/0162416 A1 Jun. 3, 2021

Related U.S. Application Data

(60) Provisional application No. 62/942,414, filed on Dec. 2, 2019.

(51) Int. Cl.
*B01L 3/00* (2006.01)
*C12M 1/00* (2006.01)
(Continued)

(52) U.S. Cl.
CPC ..... *B01L 3/502761* (2013.01); *B01L 3/50273* (2013.01); *G01N 33/5011* (2013.01);
(Continued)

(58) Field of Classification Search
None
See application file for complete search history.

(56) References Cited

U.S. PATENT DOCUMENTS 9,919,311 B2 * 3/2018 Puntambekar ...... B01L 3/50273
2004/0069717 A1 4/2004 Laurell et al.
(Continued)

*Primary Examiner* — Holly Kipouros
(74) *Attorney, Agent, or Firm* — Foley & Lardner LLP

(57) ABSTRACT

A microfluidic device for modeling a tumor-immune microenvironment can include a multiwell plate defining a plurality of microenvironment units fluidically coupled with a plurality of wells. Each microenvironment unit of the plurality of microenvironment units can include one or more compartments. Each microenvironment unit can include a trapping feature positioned within the one or more compartments. The trapping feature can be defined by a portion of at least one of a sidewall or a floor of the one or more compartments. The trapping feature can restrict movement of a tissue sample introduced into the one or more compartments and to allow fluid to flow past the tissue sample. The microfluidic device can include a plurality of micropumps each coupled with a respective well and configured to control movement of a respective fluid sample through each respective well.

12 Claims, 19 Drawing Sheets

(51) Int. Cl.
*C12M 3/00* (2006.01)
*G01N 33/50* (2006.01)

(52) U.S. Cl.
CPC . *B01L 2200/0647* (2013.01); *B01L 2300/047* (2013.01); *B01L 2300/0829* (2013.01); *B01L 2300/0864* (2013.01); *B01L 2300/168* (2013.01)

(56) References Cited

U.S. PATENT DOCUMENTS

| | | | | |
|---|---|---|---|---|
| 2014/0127733 | A1* | 5/2014 | Altiok | G01N 33/5082 |
| | | | | 435/23 |
| 2014/0363883 | A1* | 12/2014 | Hayes | C12M 23/12 |
| | | | | 435/288.7 |
| 2015/0226741 | A1* | 8/2015 | Liu | G01N 33/54373 |
| | | | | 435/308.1 |
| 2016/0061814 | A1* | 3/2016 | Sniadecki | G01N 33/4905 |
| | | | | 435/29 |
| 2017/0158997 | A1* | 6/2017 | Ingber | C12M 25/14 |
| 2018/0142196 | A1* | 5/2018 | Coppeta | C12M 29/00 |
| 2018/0280971 | A1* | 10/2018 | Borenstein | C12Q 1/24 |

\* cited by examiner

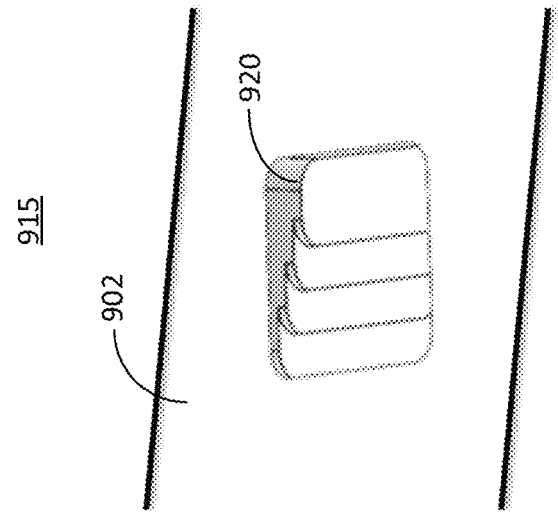
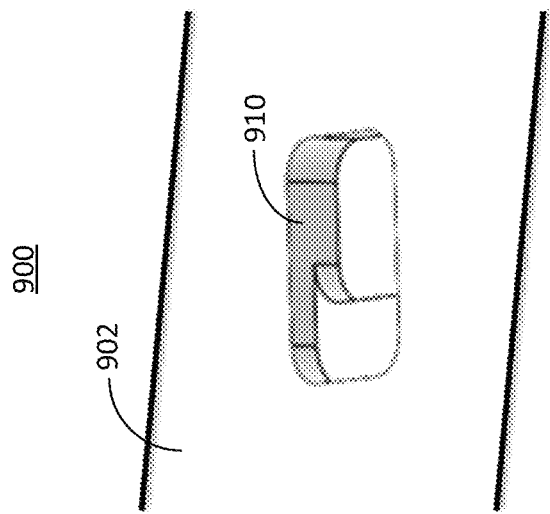

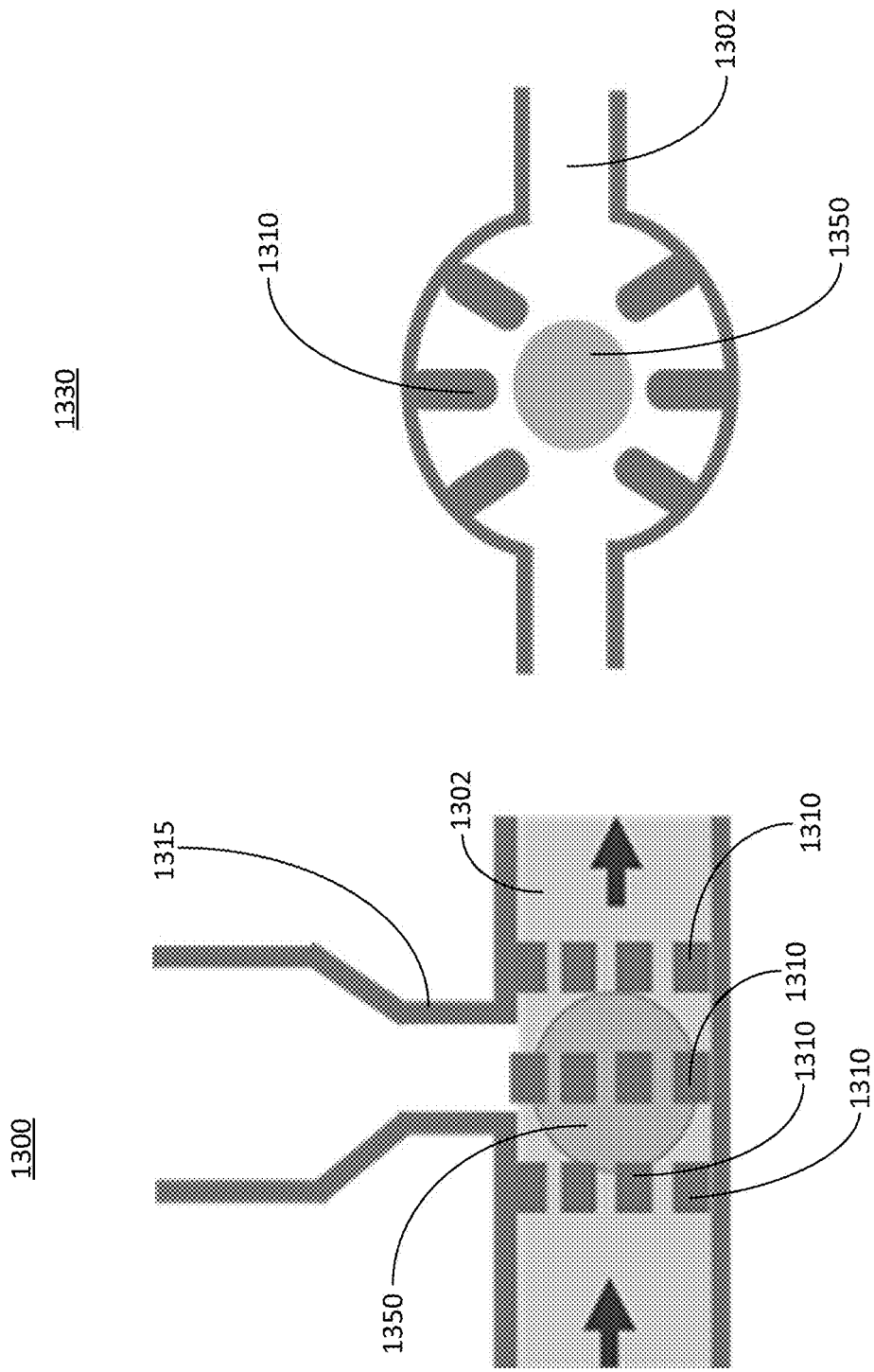

MULTIWELL DYNAMIC MODEL FOR A TUMOR-IMMUNE MICROENVIRONMENT

CROSS REFERENCE TO RELATED APPLICATIONS

The present application claims priority under 35 U.S.C. § 119(e) to U.S. Provisional Patent Application No. 62/942,414, titled "MULTIWELL DYNAMIC MODEL FOR A TUMOR-IMMUNE MICROENVIRONMENT," filed Dec. 2, 2019, which is incorporated herein by reference in its entirety.

BACKGROUND

Evaluating the efficacy of candidate immunotherapies against diseases such as cancer can be desirable. It can be difficult to predict the efficacy of a candidate immunotherapy due to challenges in mimicking the in vitro microenvironment in which the immunotherapy is to be introduced. For example, it can be challenging to facilitate interactions between immunotherapies and tissue samples, and to evaluate such interactions, in a laboratory setting.

SUMMARY

The present disclosure describes systems and methods for modeling a tumor-immune microenvironment. A microfluidic device for modeling such an environment can include a well plate having one or more wells (sometimes referred to herein as a "multiwell plate"). In some implementations, the multiwell plate can be a bilayer device that defines a set of microenvironment units. Each microenvironment unit can include a basal layer and an apical layer, which may be separated from one another by a permeable membrane. The microenvironment units can serve as a setting that mimics the tumor-immune microenvironment. In some implementations, each microenvironment unit can also include a mechanism for trapping a tissue sample, such as a section of a tumor on which testing of candidate immunotherapies can be performed. Such a mechanism can be referred to in this disclosure as a mechanical trapping feature. In some implementations, the mechanical trapping features can be formed from portions of channel walls or compartment walls, such as a sidewalls, ceilings, or floors of compartments or channels in each microenvironment unit. While a tissue sample is trapped by a mechanical trapping feature, it can be perfused with a candidate immunotherapy, and the interaction between the trapped tissue sample and the candidate immunotherapy can be observed and monitored over time. In some implementations, the microfluidic device can include a series of micropumps coupled with respective wells and capable of being individually controlled. Thus, perfusion rates, candidate immunotherapies, and other parameters can be varied simultaneously across the microenvironment units of the multiwell plate, thereby increasing the speed and efficiency with which a group of candidate immunotherapies can be evaluated.

At least one aspect of the present disclosure is generally directed to a microfluidic device. The microfluidic device can include a well plate comprising one or more wells. The well plate can define a one or more microenvironment units. The microenvironment units can be fluidically coupled with the one or more of wells. Each microenvironment unit can include one or more compartments. Each microenvironment unit can include a trapping feature positioned within the one or more compartments. The trapping feature can be defined by a portion of at least one of a sidewall or a floor of the one or more compartments. The trapping feature can restrict movement of a tissue sample introduced into the one or more compartments and can allow fluid to flow past the tissue sample. The microfluidic device can include one or more micropumps. Each of the one or more micropumps can control introduction of a fluid sample to a respective well of the plurality of wells.

In some implementations, the one or more compartments of each microenvironment unit of the microfluidic device can include a basal compartment, an apical compartment, and a membrane separating the basal compartment from the apical compartment. In some implementations, each microenvironment unit of the microfluidic device can include a basal channel having a basal channel inlet and a basal channel outlet. In some implementations, the basal compartment can include a portion of the basal channel between the basal channel inlet and the basal channel outlet. In some implementations, each microenvironment unit of the microfluidic device can include an apical channel having an apical channel inlet and an apical channel outlet. In some implementations the apical compartment can include a portion of the apical channel between the apical channel inlet and the apical channel outlet.

In some implementations, at least one micropump of the plurality of micropumps can be coupled with at least two wells of the plurality of wells. In some implementations, the microfluidic device can include a fluid reservoir coupled with at least one micropump of the plurality of micropumps. In some implementations, the microfluidic device can include a controller communicatively coupled with each micropump of the plurality of micropumps. In some implementations, the controller can selectively control each micropump of the plurality of micropumps independently. In some implementations, the plurality of micropumps can include at least a first micropump fluidically coupled with the basal compartment of a first microenvironment unit of the plurality of microenvironment units via a first well and a second micropump coupled with the apical compartment of the first microenvironment unit via a second well.

In some implementations, the membrane can include an apical surface and a basal surface. In some implementations, the basal surface can be opposite the apical surface. In some implementations, the membrane can include a functionalized coating applied to the at least one of the basal surface or the apical surface. In some implementations, the functionalized coating can include a gel. In some implementations, the microfluidic device can include a transparent optical layer coupled with the well plate. In some implementations, the transparent optical layer can provide an optical interface into each microenvironment unit of the well plate. In some implementations, the optical interface can have a thickness selected to permit the tissue sample in each microenvironment unit to be observed using a confocal microscope.

In some implementations, the trapping feature can be a mechanical trapping feature. In some implementations, the trapping feature of at least one microenvironment unit of the plurality of microenvironment units extends away from the floor of the one or more compartments into the one or more compartments to reduce a cross-sectional area of the one or more compartments. In some implementations, the mechanical trapping feature of the at least one microenvironment unit comprises at least a first step extending a first distance into the one or more compartments and a second step adjacent to the first step and extending a second distance into the one or more compartments. In some implementations, the second distance is greater than the first distance. In some implementations, the second step is positioned downstream from the first step.

In some implementations, the trapping feature of the at least one microenvironment unit comprises one or more raised surfaces extending away from the floor of the one or more compartments into the one or more compartments. In some implementations, each of the one or more raised surfaces are positioned on the floor of the one or more compartments in an arrangement that exhibits symmetry about a longitudinal axis of the one or more compartments. In some implementations, at least one of the one or more raised surfaces has a curved shape. In some implementations, the trapping feature of the at least one microenvironment unit does not extend to a ceiling of the one or more compartments, opposite the floor of the one or more compartments.

In some implementations, the trapping feature of at least one microenvironment unit of the plurality of microenvironment units comprises a first portion of a first sidewall and a second portion of a second sidewall. In some implementations, the second portion of the second sidewall can be opposite the first portion of the first sidewall. In some implementations, the first portion the first sidewall and the second portion of the second sidewall are each tapered to reduce a cross-sectional area of the one or more compartments. In some implementations, the first portion of the first sidewall and the second portion of the second sidewall are offset from a vertical center of the one or more compartments.

At least one other aspect of the present disclosure is generally directed to a method. The method can include introducing a tissue sample into each microenvironment unit of a plurality of microenvironment units defined by a well plate having a plurality of wells. Each microenvironment unit can include one or more compartments. Each microenvironment unit can include a trapping feature positioned within the one or more compartments. The trapping feature can be define by a portion of at least one of a sidewall or a floor of the one or more compartments. The trapping feature can restrict movement of the tissue sample in the one or more compartments and to allow fluid to flow past the tissue sample. The method can include controlling a plurality of micropumps each coupled with a respective well of the plurality of wells to introduce a respective fluid sample into the respective wells. Each of the respective wells is fluidically coupled with at least one of the plurality of microenvironment units. The method can include observing an interaction between the tissue sample of a first microenvironment unit and the fluid sample introduced into a first well of the plurality of wells.

In some implementations, at least a portion of the well plate can include a transparent material. In some implementations, observing the interaction between the tissue sample of the first microenvironment unit and the fluid sample introduced into the first well comprises positioning a lens of a microscope in proximity to the first microenvironment unit. In some implementations, the method can include controlling at least one micropump of the plurality of micropumps to introduce a second fluid sample comprising a plurality of cells into an apical compartment of the one or more compartments of the first microenvironment unit. In some implementations, controlling the plurality of micropumps comprises controlling at least two of the plurality of micropumps independently from one another.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. The foregoing and other objects, aspects, features, and advantages of the disclosure will become more apparent and better understood by referring to the following description taken in conjunction with the accompanying drawings, in which:

FIGS. 9A, 9B, 9C, and 9D show various views of channels having mechanical trapping features, in accordance with one or more implementations;

FIGS. 13A and 13B show various views of a channel having a mechanical trapping feature, in accordance with one or more implementations;

DETAILED DESCRIPTION

Figure 1:
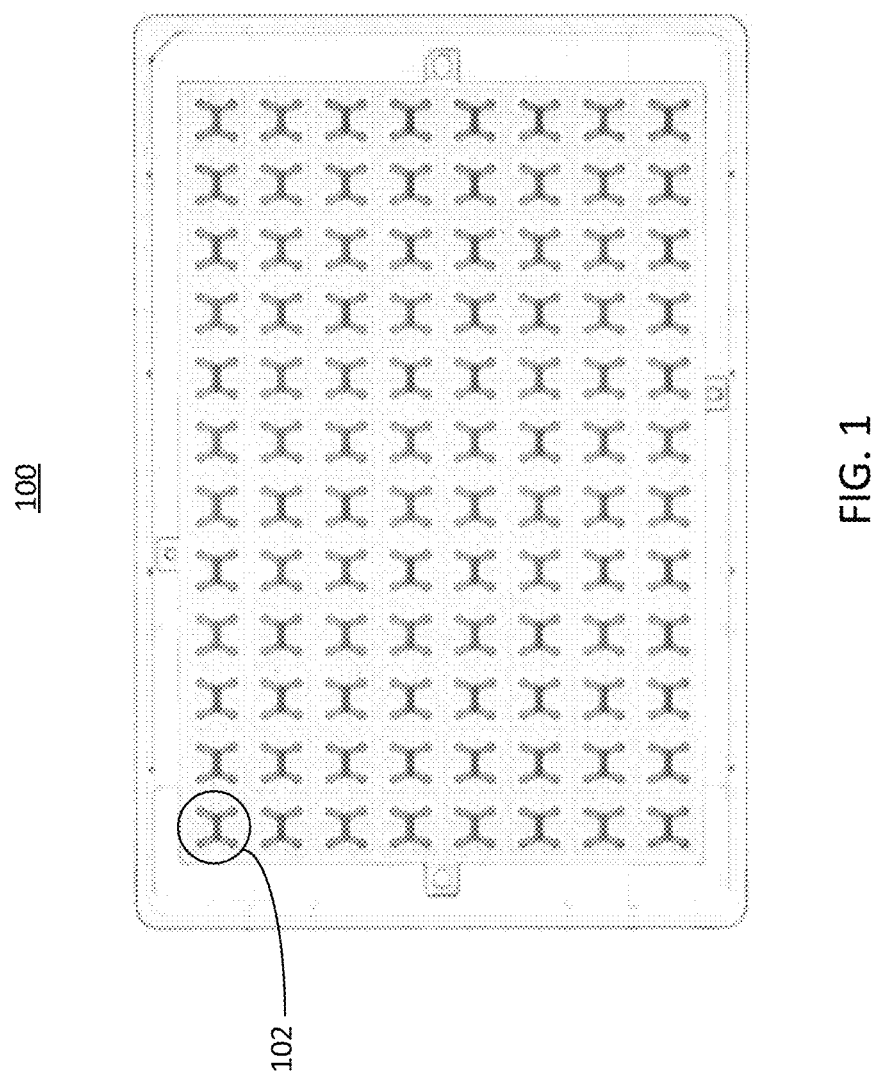
FIG. 1 illustrates a top view of an example multiwell plate, in accordance with one or more implementations.

The various concepts introduced above and discussed in greater detail below may be implemented in any of numerous ways, as the described concepts are not limited to any particular manner of implementation. Examples of specific implementations and applications are provided primarily for illustrative purposes.

The present disclosure describes systems and methods for modeling a tumor-immune microenvironment. For example, such a microenvironment can mimic aspects of an in vitro environment that can contain a tissue sample of interest, such as a tumor or a portion of a tumor. A microfluidic device for modeling such an environment can include a multiwell plate. In some implementations, the multiwell plate can be a bilayer device that defines a set of microenvironment units. A bilayer device can include a plurality of chambers or channels separated from one another by a semipermeable membrane. In some other implementations, the multiwell plate can be a single layer device, in which the microenvironment units are defined by single-layer channels or chambers. A microenvironment unit can be a self-contained area of the multiwell plate in which environmental conditions and immunotherapies can be monitored and observed, independently from other microenvironment units of the device. Thus, the device may be used to perform a set of simultaneous experiments or observations under different conditions, thereby allowing multiple immunotherapies to be evaluated in parallel with one another.

In some implementations, each microenvironment unit can be fluidically coupled with at least one respective well of the multiwell plate. In some implementations in which the device is a multilayer device, each microenvironment unit of the device can include a basal layer and an apical layer, which may be separated from one another by a permeable membrane. The microenvironment units can serve as a setting that mimics the tumor-immune microenvironment. In some implementations, each microenvironment unit can also include a mechanism for trapping a tissue sample, such as a section of a tumor on which testing of candidate immunotherapies can be performed. Such a mechanism can be referred to in this disclosure as a mechanical trapping feature. In some implementations, the mechanical trapping features can be formed from portions of channel walls or compartment walls, such as a sidewalls, ceilings, or floors of compartments or channels in each microenvironment unit.

While a tissue sample is trapped by a mechanical trapping feature in a given microenvironment unit, it can be perfused with a candidate immunotherapy. The interaction between the trapped tissue sample and the candidate immunotherapy can be observed and monitored within the microenvironment unit over time. In some implementations, the microfluidic device can include a series of micropumps coupled with respective wells and capable of being individually controlled. Thus, perfusion rates, candidate immunotherapies, and other parameters can be varied simultaneously across the set of microenvironment units of the multiwell plate, thereby increasing the speed and efficiency with which a group of candidate immunotherapies can be evaluated.

FIG. 1 illustrates a top view of an example multiwell plate 100. The multiwell plate 100 includes a plurality of microenvironment units 102. The microenvironment units 102 are arranged in a rectangular grid pattern across a surface of the multiwell plate 100. The multiwell plate 100 is depicted as including 96 microenvironment units 102 arranged in a 12×8 grid, however it should be understood that other arrangements, which may include more or fewer microenvironment units 102, are also possible. Each microenvironment unit 102 can serve as an area for one or more cell cultures to be introduced. In some implementations, other substances, such as therapeutic substances, can be introduced into the microenvironment units 102, and their interactions with the cell cultures can be observed or measured.

Figure 2:
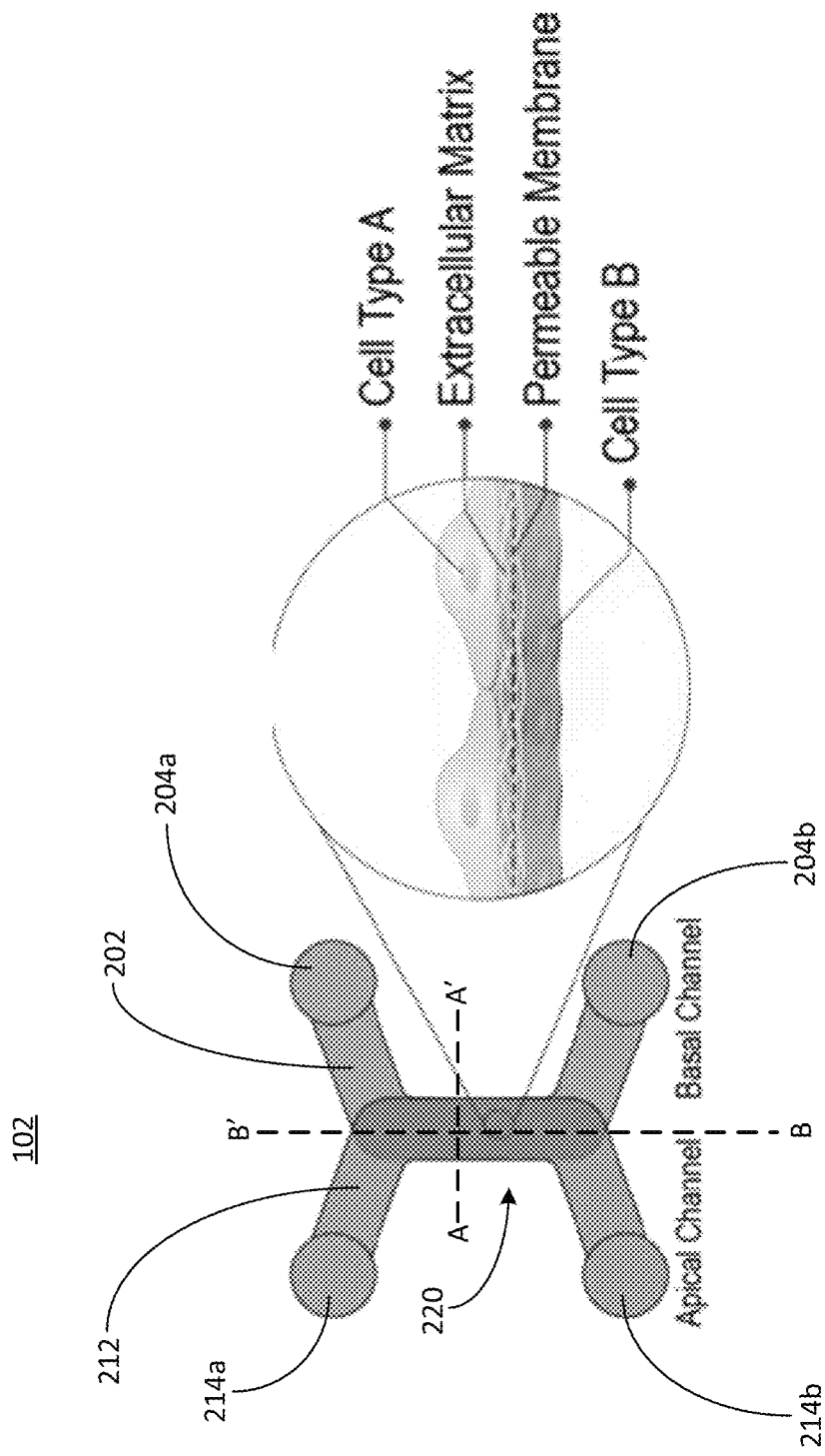
FIG. 2 illustrates a top view of a portion of an example multiwell, in accordance with one or more implementations.

FIG. 2 illustrates a top view of a portion of an example multiwell plate. In some implementations, the multiwell plate depicted in FIG. 2 can correspond to the multiwell plate 100 illustrated in FIG. 1. The portion shown in FIG. 2 includes a single microenvironment unit 102 of the multiwell plate 100. The microenvironment unit 102 can include a basal channel 202. The microenvironment unit 102 can include an apical channel 212. The basal channel can include two ports 204*a* and 204*b* (generally referred to as ports 204). The apical channel can include two ports 214*a* and 214*b* (generally referred to as ports 214). The microenvironment unit 102 also includes an overlapping portion 220 in which the basal channel 202 and the apical channel 212 overlap one another. It should be understand that structures referred to as channels in this disclosure may also be referred to as chambers or compartments. For example, the basal channel 202 and the apical channel 212 may also be referred to in this disclosure as the basal compartment and the apical compartment, respectively.

In some implementations, tissue fragments such as pieces of a tumor may be contained in the overlapping portion 220 of the microenvironment unit 102. In some implementations, fluid samples can also be introduced into the basal channel 202 via the ports 204, as well as into the apical channel 212 via the ports 214. The fluid samples may include, for example, therapeutic substances such as drugs. For example, the fluid samples may be or may include candidate immunotherapies that are intended to treat patients who exhibit tumors or other tissue similar to the tissue sample contained in the overlapping portion 220. Interactions between the tissue sample and the substances included in the fluid samples can be observed in the overlapping portion 220 as a way to evaluate the efficacy of the candidate immunotherapy.

The overlapping portion 220 can also include additional features selected to mimic a particular microenvironment, such as an in vitro environment in which a tumor to be treated by the candidate immunotherapy is likely to be present. For example, cell cultures may be grown in the overlapping portion 220. For example, the overlapping portion 220 can include a permeable membrane, as shown in the enlarged view on the left hand side of FIG. 2. The membrane can separate the basal channel 202 from the apical channel 212 in the overlapping portion 220. In some implementations, a cell culture can be introduced on the apical channel side of the membrane. In some implementations, a cell culture can be introduced on the basal channel side of the membrane. In some implementations, cell cultures can be introduced on both the apical channel side and the basal channel side of the membrane. The cell cultures on each side of the membrane can be the same or different from one another.

In some implementations, the overlapping portion 220 can include features to help ensure that the tissue sample under test remains secured in place within the overlapping portion 220 over time. For example, such features may include mechanical features formed from the walls of the basal channel 202 or the apical channel 212 that are designed to trap, catch, or otherwise retain the tissue sample in a fixed location within the overlapping portion 220 of the microenvironment unit 102. Such features are described further below It should be understood that while the example multiwall plate described herein can include one or more multi-layer microenvironment units, that single-layer microenvironments units are also possible. Single-layer microenvironment units can include one or more chambers, which may be separated by a semi-permeable membrane. Single-layer microenvironment units may not include an overlapping portion, and instead may share a wall or a portion of a chamber. For example, a single layer microenvironment unit can be similar to the microenvironment unit 102, but without the overlapping region across two layers. Instead, a single-layer microenvironment unit can include the apical channel 212 (which may be referred to as a "first channel") and the basal channel 202 (which may be referred to as a "second channel") defined within a single layer (e.g., without overlapping, etc.). The first channel and the second channel can be defined in a single layer of a substrate, similar to the substrates described herein. The first channel and the second channel in the single-layer microenvironment unit can share a wall or surface (e.g., a sidewall, etc.). The shared side-wall can include a semi-permeable membrane that allows the channels of the single-layer microenvironment unit to be in fluid communication with one another. Although only two channels are described herein with respect to microenvironment units, it should be understood that any number of channels are possible. For example, a microenvironment unit can include a single channel defined in a single layer. The single channel can include a tissue trap. In some implementations, any number of channels on any number of layers are possible, with any number of tissue trapping features (e.g., as described herein below, etc.), any number of membranes, or any number of overlapping portions, channels, or ports.

Figure 3:
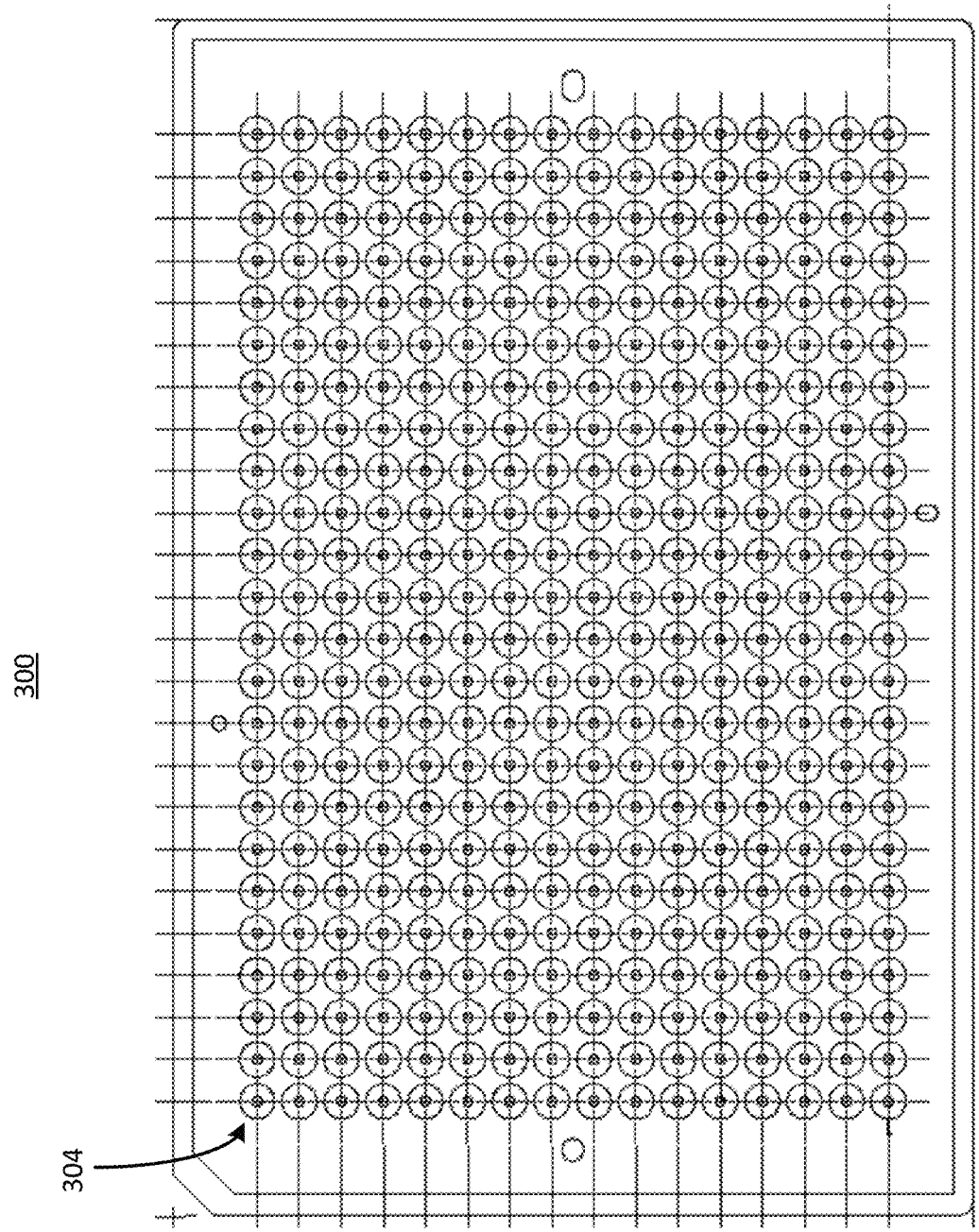
FIG. 3 illustrates a top view of another example multiwell plate, in accordance with one or more implementations.

FIG. 3 illustrates a top view of another example multiwell plate 300. The multiwell plate 300 can be similar to the multiwell plate 100 depicted in FIG. 1. The multiwell plate 300 includes a plurality of ports 304. The ports 304 are arranged in a 24×16 rectangular array, for a total of 384 ports. Channels are not depicted in the multiwell plate 300 of FIG. 3 for illustrative clarity, however in some implementations, each port 304 may serve as a port for at least one channel. In implementations in which the multiwell plate 300 is a bilayer device, each port 304 may serve as a port for a basal channel or an apical channel of the bilayer device, similar to the ports 204 and the ports 214 shown in FIG. 2. For example, groups of ports 304 each including four ports may serve as the set of ports for a single microenvironment unit such as that shown in FIGS. 1 and 2. In some implementations, the multiwell plate 300 having 384 ports can be used to support 96 such microenvironment units, similar to the microenvironment unit 102 shown in FIG. 2. In some other implementations, the multiwell plate 300 can be a single layer device rather than a bilayer device. For example, each port 304 may serve as either an inlet or an outlet of a microfluidic channel. For example, the microfluidic channel can be a microenvironment unit having an inlet and an outlet, and therefore groups of two ports 304 may each form a respective microenvironment unit. Thus, the multiwell plate 300 may support 192 such microenvironment units. In still other implementations, each port 304 may be coupled with a respective chamber within the multiwell plate 300. Such a chamber can serve as a microenvironment unit. Thus, the multiwell plate 300 can support 384 such microenvironment units. In some implementations, the types of microenvironment units may vary across the multiwell plate 300. For example, some microenvironment units may include channels connected by two or more of the ports 304, while other microenvironment units include chambers coupled with a single respective port 304. In some implementations, the ports 304 can each have a circular shape as depicted in FIG. 3. In some other implementations, the ports 304 can have a different shape, such as a square shape, a rectangular shape, another polygonal shape, or an irregular shape, rather than the round shape shown in FIG. 3.

Figure 4A:
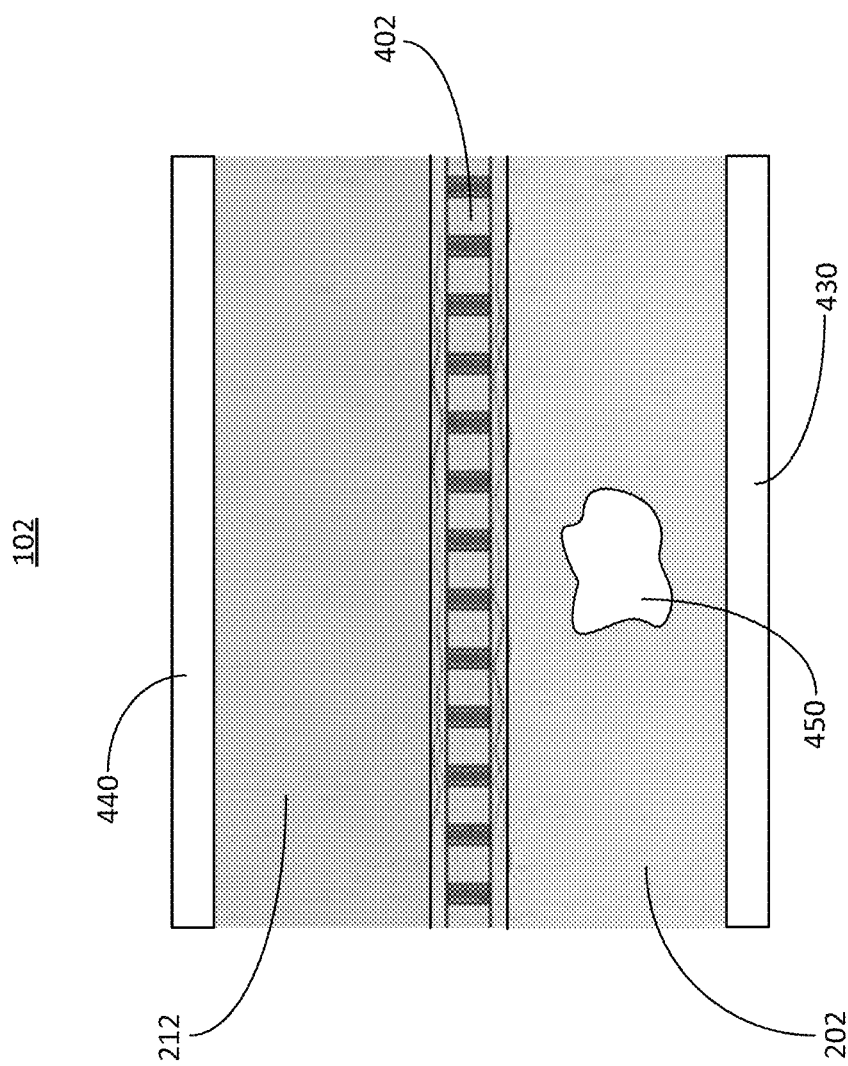
FIG. 4A illustrates a cross-sectional view of a portion of a microenvironment unit shown in the multiwell plate of FIG. 2, in accordance with one or more implementations.
Figure 4B:
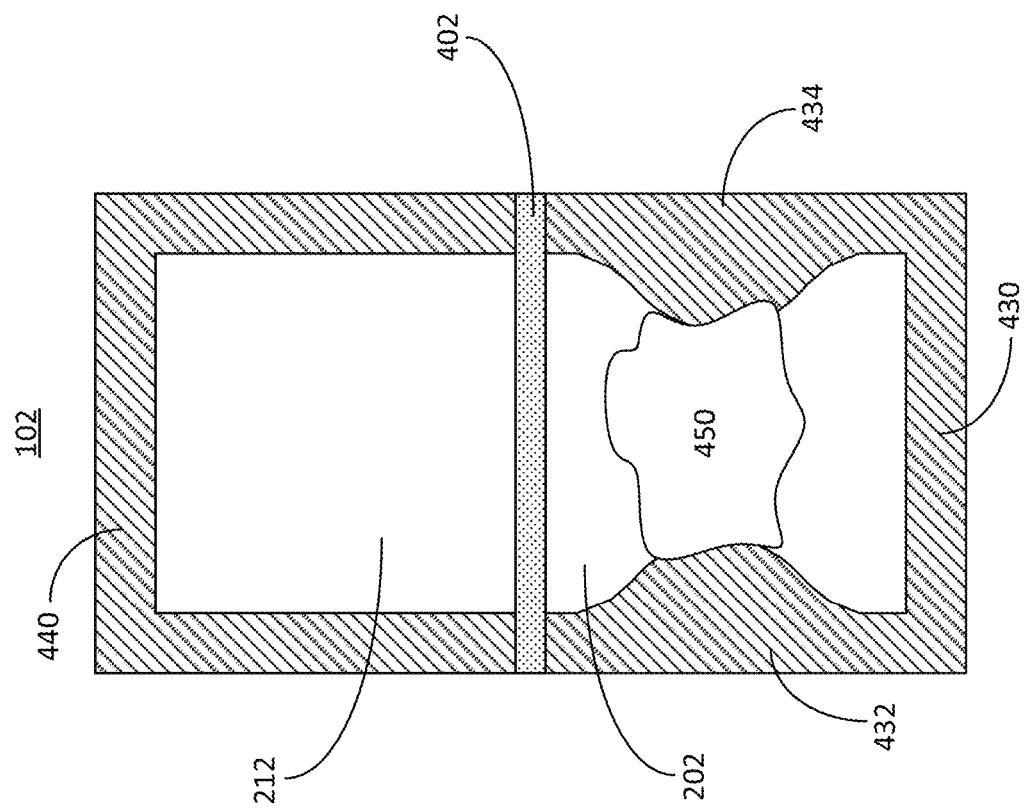
FIG. 4B illustrates another cross-sectional view of a portion of a microenvironment unit shown in the multiwell plate of FIG. 2, in accordance with one or more implementations.

FIG. 4A illustrates a cross-sectional view of a portion of the microenvironment unit 102 shown in FIG. 2. The cross-sectional view of FIG. 4A is taken along the line A-A' of FIG. 2. FIG. 4B illustrates another cross-sectional view of a portion of the microenvironment unit 102 shown in FIG. 2. The cross-sectional view of FIG. 4B is taken along the line B-B' of FIG. 2, and shows the microenvironment unit 102 from a perspective that is perpendicular to the perspective shown in FIG. 4A. Referring now to FIGS. 4A and 4B, the microenvironment unit 102 can include the basal channel 202, the apical channel 214, and a membrane 402 separating the basal channel 202 from the apical channel 212. In some implementations, a first cell culture can optionally be seeded on a first side of the membrane 402, and a second cell culture can optionally be introduced on a second side of the membrane 402. In some implementations, other coatings or features, such as a functionalized coating or gel may be added to either or both sides of the membrane 402. In some implementations, the basal channel 202 and the apical channel 212 can be defined within a single layer of a substrate material, such that each of the basal channel 202 and the apical channel 212 are position side-by-side. In such implementations, the membrane 402 can form a sidewall of each of the basal channel 202 and the apical channel 212, such that a desired fluid can flow between each channel.

In some implementations, the functionalized coating can be added to any side of any channel or chamber described herein. For example, the functionalized coating can be added to the floor of the basal chamber, or the ceiling of the apical chamber. In some implementations, the functionalized coating can be applied to any portion of any surface of a microenvironment unit. The functionalized coating can be applied to the tissue trapping features described herein, such as the tissue trapping features depicted in FIGS. 5-11.

Other coatings can also be applied to the tissue trapping region, or other surfaces in the microenvironment units, to facilitate the trapping of tissue samples introduced via fluids. Such coatings can include adhesives that are applied to the internals of the microenvironment units prior to the introduction of a tissues sample. The adhesives can be applied to portions of the tissue trapping region to prevent tissue samples from becoming dislodged from tissue trapping regions. An adhesive coating can also prevent tissue samples from moving around when the tissue sample is exposed to fluid flows (e.g., via the micropumps described herein, etc.). In some implementations, the tissue trapping feature in a microenvironment unit 102 can be a portion of the microenvironment unit that has been treated with an adhesive. In such implementations, the microenvironment may not necessarily include a mechanical trapping feature, and may instead rely on the adhesive coating to trap a tissue sample within a microenvironment unit.

Some example adhesive coatings can include any suitable glue that is compatible with both tissue samples and with the materials used to manufacture the surfaces of the microenvironment unit. In some implementations, an adhesive can include one or more materials that can encourage cell attachment. In some implementations, an adhesive may not necessarily be a glue. Example adhesives can include an area treated to encourage cell attachment, a substance that encourages cell attachment, tethered ligands or other adhesive motifs that can attach to tissues or cells, an energetically modified surface (e.g., any surface of the microenvironment units, channels, chambers, trapping features, etc.) that encourages adhesion of cells or tissues, or any other substance that encourages attachment of cells or tissues. Thus, adhesives can be substances other than glues, and can encompass features of the surfaces of the microenvironment chamber that encourage cell attachment.

The microenvironment unit 102 can include a wall 430 enclosing the basal channel 202 and a wall 440 enclosing the apical channel 212. Because the membrane 402 separates the basal channel 202 from the apical channel 212, the wall 430 can serve as a floor of the basal channel 202 and the wall 440 can serve as a ceiling of the apical channel 212. Likewise, the membrane 402 can serve as a ceiling of the basal channel 202 and can serve as a floor of the apical channel 212. The microenvironment unit 102 can also include other walls, such as the sidewalls 432 and 434 that enclose the basal channel basal channel 202 as shown in FIG. 4B. These sidewalls are not visible in the cross-sectional view of FIG. 4A.

A tissue sample 450 has been introduced into the microenvironment unit 102 in the example shown in FIG. 4A. The tissue sample 450 can be a group of cultured cells or spheroids, or a tissue fragment. The tissue sample 450 can be human or animal in origin, and may be created from a syngeneic process, a cell line or primary cell source, or may be excised from an animal or human and introduced into the microenvironment unit 102. In some implementations, the microenvironment unit 102 can be used as a testing mechanism for oncology applications. Thus, the tissue sample 450 may be derived from a tumor. In some other implementations, the tissue sample 450 can be a tissue sample related to or derived from a liver, a kidney, a gut, a lung, a vascular system, a bone, skin, a brain, a connective tissue, a neural or sensory tissue, or another organ from a human or an animal.

The microenvironment unit 102 also includes a mechanical trapping feature configured to secure the tissue sample 450 in place within the basal channel 202 of the microenvironment unit 102. In this example, the mechanical trapping feature is formed from portions of the sidewalls 432 and 434 of the basal channel 202 that taper inwards to reduce a cross-sectional area of the basal channel 202 in the vicinity of the tapered portions. The tapered sidewalls 432 and 434 are depicted in FIG. 4B. Because of the reduction in cross-sectional area of the basal channel 202 due the tapered sidewalls 432 and 434, the tissue sample 450 becomes trapped as it flows down basal channel 202. As a result, the tissue sample 450 is held in place by the tapered sidewalls 432 and 434.

While the tissue sample 450 is trapped by the tapered sidewalls 432 and 434, space remains above and below the tissue sample 450 to provide a fluid path through the basal channel 202. Thus, fluid can continue to flow through the microenvironment unit 102 while the tissue sample 450 is trapped. The position at which the tissue sample 450 is trapped can differ from typical cell culture applications in multiwell plates in which the cells are cultured either on the bottom surface of the well or on a Transwell-type membrane that is placed in the well. In this disclosure, the tissue sample 450 can be introduced into a well of the multiwell plate and can become fixed or trapped at a location within the microenvironment unit 102 so that it can be monitored over time while it is perfused with fluid.

The tapered sidewalls 432 and 343 can hold the tissue sample 450 in place and can also permit flow toward, through, and around the tissue sample 450, so that an undue pressure does not build up proximal to the tissue sample 450. The size of the tissue sample 450 as well as the degree of taper for the sidewalls 432 and 434 (e.g., the total reduction in cross sectional area of the basal channel 202 due to the tapered sidewalls 432 and 434) can be selected to achieve either or both of a predetermined rate of fluid flow or a predetermined pressure build up behind the tissue sample 450. For example, if the tissue sample 450 blocks only a relatively small fraction of the cross-sectional area of the basal channel 202, then most of the flow may not interact with the tissue sample 450. On the other hand, if the tissue sample 450 blocks a relatively large portion of the basal channel 202, then little or no fluid may be able to pass through the basal channel 202 and a large pressure may build up behind the tissue sample 450. Therefore, a balance can be struck between the ability to maintain reasonable pressures and the need to improve the interaction potential of media components flowing through the basal channel 202 and the tissue sample 450. In some implementations, the tissue sample 450 may obstruct about 10%, about 20%, about 30%, about 40%, about 50%, about 60%, about 70%, about 80%, or about 90% of the basal channel 202.

In some implementations, the fluid flowing through either or both of the basal channel 202 and the apical channel 212 may include cells that have been introduced into the fluid samples. Such cells may flow toward, through, and past the tissue sample 450. While many disease models and drug discovery models may require only that drugs introduced into the media interact with the various cell types contained within a captured tissue construct, other applications may benefit from having interactions between mobile cells traversing the microenvironment and the captured tissue sample 450, in the absence or presence of drugs introduced in the media. Thus, in some implementations, cells such as lymphocytes obtained from tissue fragments from the same tissue source as the tissue sample 450 can be introduced into the flow stream, so that interactions between those lymphocytes and the trapped tissue sample 450 can be observed over time. In some implementations, such lymphocytes could be obtained from digestion of a sample that is then minced to provide the tissue sample 450, and the lymphocytes could be activated, expanded, and treated with drugs prior to introduction into the system. In addition to lymphocytes (or as an alternative), other immune cells such as dendritic cells, or organ-specific cells or cancer cells could be introduced into either or both of the basal channel 202 and the apical channel 212 for observation of interactions with captured tissue sample 450.

In some implementations, cells can be introduced into the apical channel 212. These cells can then flow via pumping action across the apical channel 212 and then make their way through the membrane 402 to reach the tissue sample 450 on the basal side of the membrane 402 in the basal channel 202. To facilitate this, the membrane 402 can have a pore size and a pore density selected to permit such transport, and the membrane crossing may be guided or driven by a cytokine gradient generated by the tissue sample 450 or by a separately controlled mechanism. In some implementations, if the cells typically migrate via crawling or rolling action through tissue sample 450, then the tissue sample 450 may be positioned proximal to the basal surface of the membrane so that cells are not forced to "swim" through media to reach the tissue sample 450 when they pass through the membrane.

The properties of the membrane 402 in device can be guided by the requirements of a particular application. The pore size, pore density, surface properties, thickness and hydraulic permeability of the membrane may be tuned for specific applications, for example either to exclude cell transport or control the transit of large molecules. In some implementations, the properties of the membrane 402 can be selected to permit wide latitude in membrane crossing. The membrane 402 can be a commercially available item that is incorporated into the microenvironment unit 102 without modification. In some other implementations, the membrane 402 can be functionalized by molecules or gels. Such a gel may be integrated onto either or both of the basal or apical sides of the membrane 402, or into either or both of the basal channel 202 or the apical channel 212 (e.g., either away from or adjacent to the membrane 402). Such a gel can also be positioned adjacent to the tissue sample 450 (e.g., on the sidewalls 432 and 434) or embedded into the tissue sample 450 itself.

In some implementations, the membrane 402 can be or can include any of a membrane, a filter, a mesh, or other substance that allows liquid to be forced through it while trapping cells on it so they can adhere, spread and grow. Pore sizes, mesh spacing, or general transport properties of the membrane 402 can be adjusted to control the relation between cell attachment, fluid flow, and pressure driving the fluid flow. In some implementations, the membrane 402 can be designed for a desired hydraulic resistance along with cell attachment properties. In some implementations, the membrane 402 can also be a porous mesh, gel, or other material that allows preferential transport of liquid through it while limiting cell transport through it. The membrane 402 can be embossed, etched, laser machined, mechanically machined, ablated or otherwise patterned with mechanical surface features to influence cell attachment, adhesion, spreading, or other cell properties. The membrane 402 can also be coated, energetically treated via a plasma or other means, affixed with a self-assembled monolayer, surface deposited, or otherwise modified chemically to have chemical surface features to influence cell attachment, adhesion, spreading, or other cell properties. In some implementations, the membrane 402 can have both mechanical and chemical surface features, with either or both such features placed on the scaffold in selected areas so that cell properties are modified within those areas. For example, some areas of the membrane 402 can have a chemical surface modification to limit cell attachment while others would have a mechanical surface modification to encourage cell attachment.

In some implementations, the tissue sample 450 may be introduced and fixed in a mechanical trapping feature (e.g., the tapered portion of the sidewalls 432 and 434 in the basal channel 202, and this trapping event may fix the tissue sample 450 horizontally (between the sidewalls 432 and 434) and vertically (between the floor 430 and the membrane 402 that serves as a ceiling) at a predetermined location. In some implementations, the mechanical trapping feature can be coated with an adhesive, as described herein above. An adhesive coating can secure the tissue sample to the mechanical tissue trapping feature, even when fluid flows over the tissue sample at speeds that would otherwise dislodge or move the tissue sample 450.

In some implementations, the size and shape of the mechanical feature that traps the tissue sample 450 (in this example, the sidewalls 432 and 434) can have a geometry selected based on such a predetermined location. For example, the left sidewall 432 can protrude into the basal channel 202 a greater distance than the right sidewall 434 in order to hold the tissue sample 450 at a position to the right of the horizontal center of the basal channel 202, or the right sidewall 434 can protrude into the basal channel 202 a greater distance than the left sidewall 432 in order to hold the tissue sample 450 at a position to the left of the horizontal center of the basal channel 202. Likewise, the vertical position of the tapered portions of the sidewalls 432 and 434 can be selected to achieve a desired vertical position of the tissue sample 450. In the example shown in FIG. 4B, the sidewalls 432 and 434 are positioned at the vertical center of the basal channel 202. However, in other implementations the sidewalls 432 and 434 could offset from the vertical center of the basal channel 202 in order to trap the tissue sample 450 at the offset position.

In some implementations, it may be desirable for the microenvironment unit 102 to allow for the ability to perform imaging (e.g., high-resolution imaging) of the tissue sample 450 in real-time, and therefore an unobstructed optical view into the basal channel 202 can be useful. In some implementations, for example in applications in which drugs and small molecule media components are introduced but no flow of cells is added, the tissue sample 450 may be trapped anywhere within the basal flow and chamber. However, if cells are introduced into the basal chamber, then the mechanical trapping features can be selected to secure the tissue sample 450 in a position where cell-tissue interactions are likely. In some implementations, at least a portion of the microenvironment unit 102, such as the floor 430 of the basal channel 202, can be formed from an optically transparent material, to permit observation of the tissue sample 450 from outside the microenvironment unit 102. In some implementations, an additional optical layer (e.g., a layer of glass or transparent polymer) can be attached to a portion of the microenvironment unit 102. For example, an optical layer can be secured to an exterior surface of the floor 430 of the basal channel 202 to permit optical observation (e.g., via a microscope) of the tissue sample 450 from outside the microenvironment unit 102.

The microenvironment unit 102 includes a mechanical tissue trapping feature, which in the example of FIGS. 4A and 4B includes a tapered portion of the sidewalls 432 and 434 of the basal channel 202. However, in some other implementations, additional or different mechanical trapping features can be used. For example, a mechanical trapping features can be features that are capable of being introduced into a multiwell plate such as the multiwell plate 100 of FIG. 1, rather than simply in a channel. Such feature can include channel or chamber constrictions from the sides, similar to the tapered portions of the sidewalls 432 and 434 shown in FIG. 4B. Such constrictions can be either symmetric or asymmetric in nature (e.g., with respect to a longitudinal axis of the basal channel 202, or with respect to a vertical height of the basal channel 202). In some implementations, such constrictions can be smooth and gradual. In some other implementations, the constrictions can contain sharp or angular features.

In addition to these constrictions, or alternatively, other structural components can be added to serve as mechanical trapping features. For example, there may be vertical barriers that reduce the effective channel depth in the region where the tissue sample 450 may become trapped. These features can include ramps, steps, or bumps that may be smooth or sharp, and may be symmetric or asymmetric. In general, such features can be selected to effectively trap and hold the tissue sample 450 while permitting flow past the tissue sample 450. Examples of such alternative mechanical trapping features are described further below.

Figure 5:
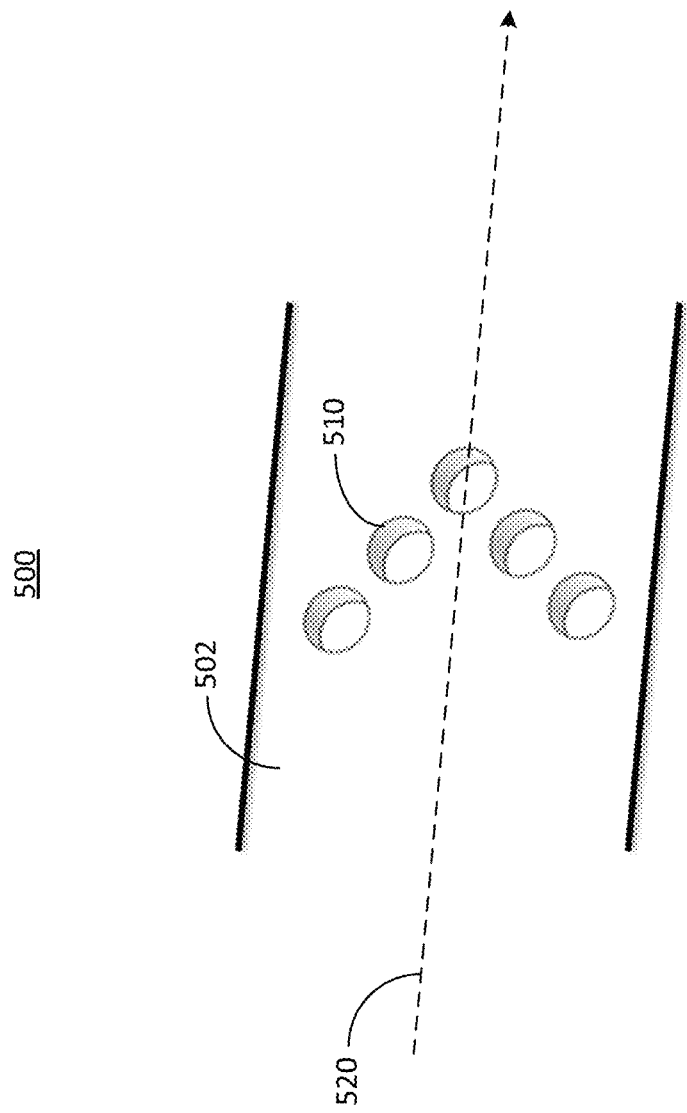
FIGS. 5, 6, 7, and 8 show various views of channels having mechanical trapping features, in accordance with one or more implementations.

FIG. 5 shows a perspective view 500 of a portion of a channel 502 having a mechanical trapping feature. In some implementations, the channel 502 can be similar to the basal channel 202 shown in FIGS. 4A and 4B. For example, the portion of the channel 502 shown in FIG. 5 can serve as a floor or a sidewall of the basal channel 202 of a microenvironment unit 102. The channel 502 also includes a mechanical trapping feature that can help to secure a tissue sample, similar to the tissue sample 450 shown in FIG. 4B, within the channel 502. In this example, the mechanical trapping feature includes a series of raised surfaces 510 positioned along the channel 502.

The channel 502 includes five raised surfaces 510. The raised surfaces 510 are arranged in a V-shaped pattern along the channel 502. Each raised surface 510 extends away from the surface of the channel 502. As a result, the presence of the raised surfaces 510 can reduce a cross-sectional area of the channel 502 in the area in which the raised surfaces 510 are located. As described above, such a reduction of cross-sectional area can case a tissue fragment similar to the tissue sample 450 of FIG. 4B to become trapped in place by the raised surfaces 510 within the channel 502, while still permitting fluid to flow towards, around, and through the tissue fragment in the channel 502. Thus, the fluid sample can interact with the tissue fragment, and the results of the interaction can be observed.

FIG. 5 illustrates a longitudinal axis of the channel 502, represented by the broken line 520. A fluid sample in the in the channel 502 can flow in the direction of the arrow. As illustrated, the raised surfaces 510 can be arranged in a manner that exhibits symmetry with respect to the longitudinal axis 520 of the channel 502. For example, one of the raised surfaces 510 is positioned along the longitudinal axis 520, and two raised surfaces 510 are positioned symmetrically on either side of the longitudinal axis 520. In some other implementations, the raised surfaces 510 may not exhibit symmetry with respect to the longitudinal axis 520.

In some implementations, the raised surfaces 510 may extend upward from the surface of the channel 502 (e.g., a floor of the channel 502) towards an opposing surface (e.g., a ceiling of the channel 502). In some implementations, the raised surfaces 510 may not extend all the way to the opposing surface. Stated differently, the raised surfaces 510 may extend a distance that is less than a height of the channel 502. In some implementations, the raised surfaces 510 may extend 1%, 2%, 3%, 4%, or 5% of the distance towards the opposing surface of the channel 502. In some implementations, the raised surfaces 510 may extend 10%, 20%, 30%, 40%, or 50%, 60%, 70%, 80%, or 90% of the distance towards the opposing surface of the channel 502. The raised surfaces 510 may have different heights, or each may be the same height. In addition, the cross-sectional shapes of the raised surfaces 510 may be circular as depicted in FIG. 5, or may be another shape. In some implementations, the cross-sectional shape may vary across the raised surfaces 510. Other examples of shapes and arrangements for raised surfaces that can form a mechanical trapping feature are described further below.

Figure 6:
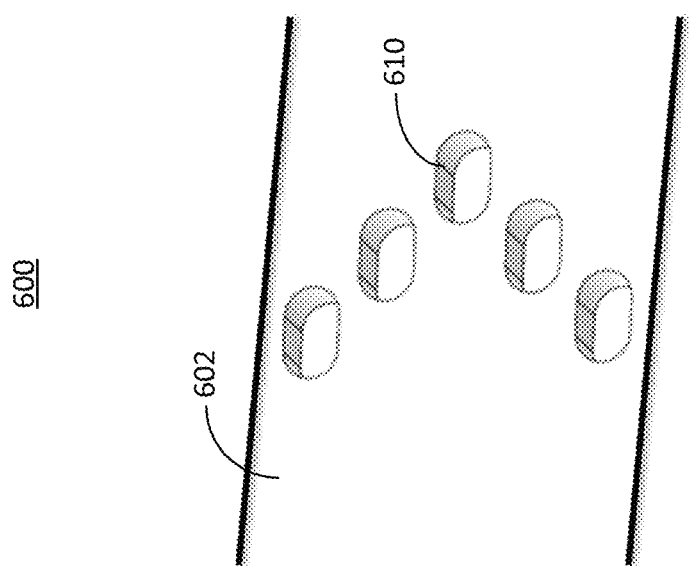

FIG. 6 shows another perspective view 600 of a portion of a channel 602 having a mechanical trapping feature. In some implementations, the channel 602 can be similar to the basal channel 202 shown in FIGS. 4A and 4B. For example, the portion of the channel 602 shown in FIG. 6 can serve as a floor or a sidewall of the basal channel 202 of a microenvironment unit 102. The channel 602 also includes a mechanical trapping feature that can help to secure a tissue sample, similar to the tissue sample 450 shown in FIG. 4B, within the channel 602. In this example, the mechanical trapping feature includes a series of raised surfaces 610 positioned along the channel 602.

The channel 602 includes five raised surfaces 610. The raised surfaces 610 are arranged in a V-shaped pattern along the channel 602, similar to the V-shaped patter of the raised surfaces 510 shown in FIG. 5. Each raised surface 610 extends away from the surface of the channel 602 to reduce a cross-sectional area of the channel 602 in the area in which the raised surfaces 610 are located, which can help to trap a tissue fragment similar to the tissue sample 450 of FIG. 4B. Unlike the raised surfaces 510 of FIG. 5, the raised surfaces 610 of FIG. 6 have an elongated oval shape, rather than a circular shape. Thus, the raised surfaces 610 include curved edges. In some implementations, the raised surfaces 610 can be elongated in the direction of fluid flow through the channel 602. In some other implementations, the raised surfaces 610 can be elongated in a different direction, such as a direction perpendicular to the direction of fluid flow in the channel 602.

Figure 7:
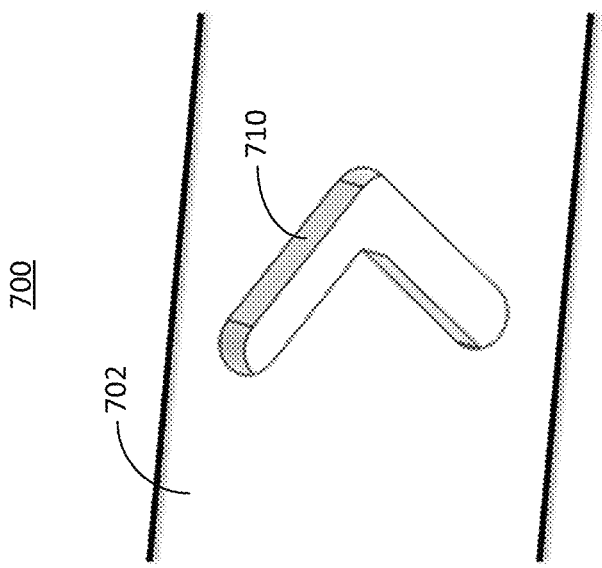

FIG. 7 shows another perspective view 700 of a portion of a channel 702 having a mechanical trapping feature. In some implementations, the channel 702 can be similar to the basal channel 202 shown in FIGS. 4A and 4B. For example, the portion of the channel 702 shown in FIG. 7 can serve as a floor or a sidewall of the basal channel 202 of a microenvironment unit 102. The channel 702 also includes a mechanical trapping feature that can help to secure a tissue sample, similar to the tissue sample 450 shown in FIG. 4B, within the channel 702. In this example, the mechanical trapping feature includes a raised 710 positioned along the channel 702.

Instead of a series of raised surfaces arranged in a V-shaped pattern, as shown in FIGS. 5 and 6, the channel 702 of FIG. 7 includes a single raised surface 710 that forms a V-shaped pattern. The raised surface 710 extends away from the surface of the channel 702 to reduce a cross-sectional area of the channel 702 in the area in which the raised surface 710 is located, which can help to trap a tissue fragment similar to the tissue sample 450 of FIG. 4B. The raised surface 710 includes curved edges as well as straight edges and sharp angles. The raised surface 710 is arranged approximately in the center of the channel 702 and exhibits symmetry about the longitudinal axis of the channel 702. However, in other implementations, the shape, position, and orientation of the raised surface 710 can be different from that depicted in FIG. 7. For example, the raised surface 710 may have a first side that is longer than a second side, and may be located at a position offset from the center of the channel 702.

Figure 8:
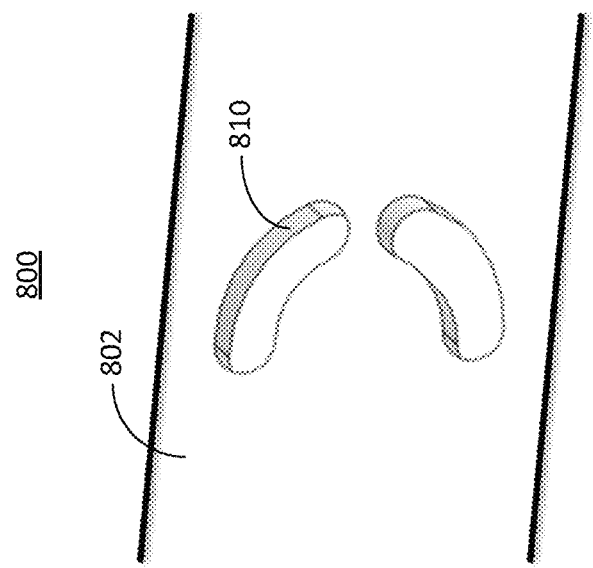

FIG. 8 shows another perspective view 800 of a portion of a channel 802 having a mechanical trapping feature. In some implementations, the channel 802 can be similar to the basal channel 202 shown in FIGS. 4A and 4B. For example, the portion of the channel 802 shown in FIG. 8 can serve as a floor or a sidewall of the basal channel 202 of a microenvironment unit 102. The channel 802 also includes a mechanical trapping feature that can help to secure a tissue sample, similar to the tissue sample 450 shown in FIG. 4B, within the channel 802. In this example, the mechanical trapping feature includes two raised surfaces 810 positioned along the channel 802.

The raised surfaces 810 are arranged in a semicircular pattern along the channel 802, rather than the V-shaped pattern of the raised surfaces shown in FIGS. 5-7. Each raised surface 810 extends away from the surface of the channel 802 to reduce a cross-sectional area of the channel 802 in the area in which the raised surfaces 810 are located, which can help to trap a tissue fragment similar to the tissue sample 450 of FIG. 4B. Unlike the raised surfaces 510 of FIG. 5, the raised surfaces 810 of FIG. 8 have an elongated curved shape and are arranged to form a semicircular pattern. The raised surfaces 810 are arranged approximately in the center of the channel 802 and are mirror images of one another, so that they exhibit symmetry about the longitudinal axis of the channel 802. However, in other implementations, the shape, position, and orientation of the raised surfaces 810 can be different from that depicted in FIG. 8. For example, one of the raised surfaces 810 may be longer than the other, and the raised surfaces 810 may not be centered within the channel 802.

FIG. 9A shows another perspective view 900 of a portion of a channel 902 having a mechanical trapping feature. In some implementations, the channel 902 can be similar to the basal channel 202 shown in FIGS. 4A and 4B. For example, the portion of the channel 902 shown in FIG. 9A can serve as a floor or a sidewall of the basal channel 202 of a microenvironment unit 102. The channel 902 also includes a mechanical trapping feature that can help to secure a tissue sample, similar to the tissue sample 450 shown in FIG. 4B, within the channel 802. In this example, the mechanical trapping feature includes a series of raised steps 910 along the channel 902.

The raised steps 910 include a first step and a second step. The second step can be adjacent to and downstream from the first step. The second step also can rise to a greater height than the first step. Together, the raised steps 910 can gradually reduce a cross-sectional area of the channel 902 in the area in which the raised steps 910 are located, which can help to trap a tissue fragment similar to the tissue sample 450 of FIG. 4B. Unlike the raised surfaces 510 of FIG. 5, the raised surfaces 810 of FIG. 8 have an elongated curved shape and are arranged to form a semicircular pattern. The raised surfaces 810 are arranged approximately in the center of the channel 802 and are mirror images of one another, so that they exhibit symmetry about the longitudinal axis of the channel 802. However, in other implementations, the shape, position, and orientation of the raised surfaces 810 can be different from that depicted in FIG. 8. For example, one of the raised surfaces 810 may be longer than the other, and the raised surfaces 810 may not be centered within the channel 802.

Figure 9D:
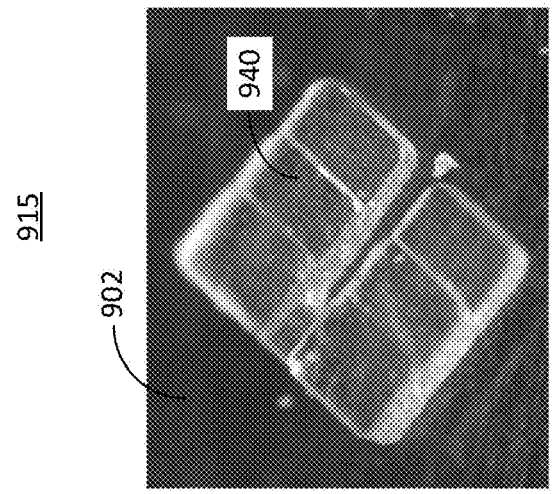
Figure 9C:
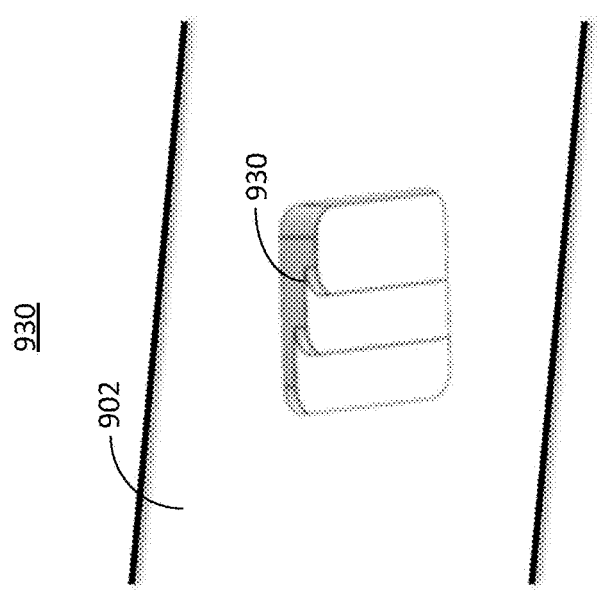

FIG. 9B shows another perspective view 915 of a portion of the channel 902 having steps 920 that form a mechanical trapping feature. The steps 920 differ from the steps 910 shown in FIG. 1 in size and number. Specifically, there are four steps 920 shown in FIG. 9B, and each of the steps 920 has a length that is shorter than the lengths of the steps 910 shown in FIG. 9A. Similarly, FIG. 9C shows another perspective view 915 of a portion of the channel 902 having steps 930 that form a mechanical trapping feature. Unlike the steps 910 and 920 of FIGS. 9A and 9B, the steps 930 include a total of three steps. FIG. 9D shows a photograph of a set of steps 940 similar to the steps 930 shown in FIG. 9C.

Figure 10:
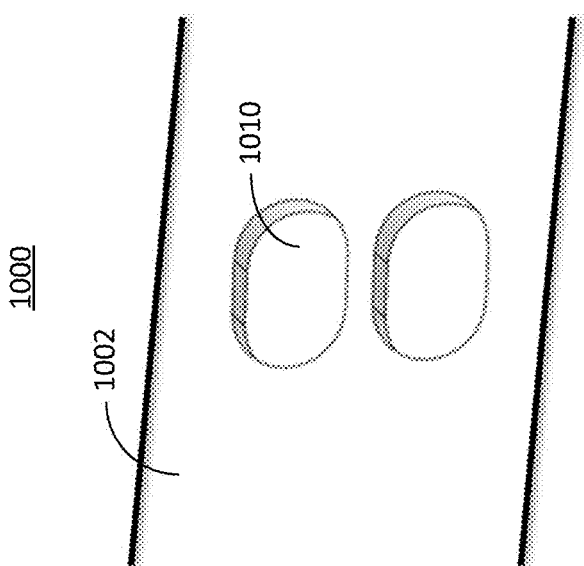

FIG. 10 shows another perspective view 1000 of a portion of a channel 1002 having a mechanical trapping feature. In some implementations, the channel 1002 can be similar to the basal channel 202 shown in FIGS. 4A and 4B. For example, the portion of the channel 1002 shown in FIG. 10 can serve as a floor or a sidewall of the basal channel 202 of a microenvironment unit 102. The channel 1002 also includes a mechanical trapping feature that can help to secure a tissue sample, similar to the tissue sample 450 shown in FIG. 4B, within the channel 1002. In this example, the mechanical trapping feature includes two raised surfaces 1010 positioned along the channel 1002.

The raised surfaces 1010 are arranged adjacent to one another across the channel 1002 with a small gap separating them. Each raised surface 1010 extends away from the surface of the channel 1002 to reduce a cross-sectional area of the channel 1002 in the area in which the raised surfaces 1010 are located, which can help to trap a tissue fragment similar to the tissue sample 450 of FIG. 4B. In some implementations, the gap between the raised surfaces 1010 can be positioned along a central or longitudinal axis of the channel 1002. Thus, fluid can flow through the gap between the raised surfaces 1010 and beneath the trapped tissue sample, thereby allowing a portion of the fluid to interact with a portion of a bottom surface of the trapped tissue sample.

Figure 11:
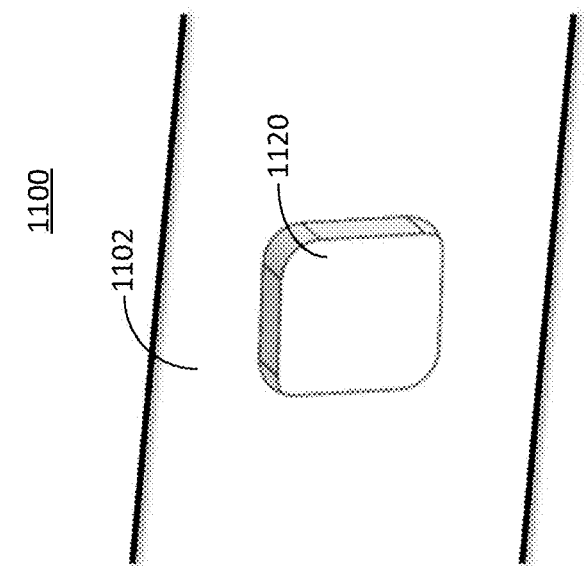
FIGS. 10 and 11 show various views of channels having mechanical trapping features, in accordance with one or more implementations.

FIG. 11 shows another perspective view 1100 of a portion of a channel 1102 having a mechanical trapping feature. In some implementations, the channel 1102 can be similar to the basal channel 202 shown in FIGS. 4A and 4B. For example, the portion of the channel 1102 shown in FIG. 11 can serve as a floor or a sidewall of the basal channel 202 of a microenvironment unit 102. The channel 1102 also includes a mechanical trapping feature that can help to secure a tissue sample, similar to the tissue sample 450 shown in FIG. 4B, within the channel 1102. In this example, the mechanical trapping feature includes a single raised surface 1110 positioned along the channel 1102. The raised surface 1110 extends away from the surface of the channel 1102 to reduce a cross-sectional area of the channel 1102 in the area in which the raised surface 1110 is located, which can help to trap a tissue fragment similar to the tissue sample 450 of FIG. 4B.

It should be understood that the examples of mechanical trapping features provided in connection with FIGS. 4A, 4B, 5-8, 9A-9D, 10, and 11 are illustrative only. Other arrangements may also be possible without departing from the scope of this disclosure. For example, while mechanical trapping features have been primarily described as being positioned in the basal compartment of a microenvironment unit, in some implementations mechanical trapping features may be included alternatively or additionally in an apical compartment of a microenvironment unit. In addition, any of the mechanical trapping features described in this disclosure may be used in connection with one another in the same microenvironment unit. For example, a microenvironment unit may include raised surfaces, as well as tapered channel walls, which together can help to secure a tissue sample in place. Furthermore, it should be understood that in a multiwell plate that includes multiple microenvironment units, the mechanical trapping features can be the same or different (e.g., with respect to position, geometry, etc.) across the microenvironment units of the plate. In some implementations, at least some of the microenvironment units may not include any mechanical trapping features.

In some implementations, a microenvironment unit may not include a basal compartment and an apical compartment separated by a membrane, but may instead include a single layer defining a channel, compartment, or chamber. It should be understood that any of the examples of mechanical trapping features of FIGS. 4A, 4B, 5-8, 9A-9D, 10, and 11 may also be used in such a single-layer microenvironment unit. In some implementations, other mechanical trapping features can also be incorporated into a channel or compartment configured to receive a tissue sample via a dedicated tissue fragment delivery port above the channel or compartment. Examples of such features are shown and described further below in connection with FIGS. 12A, 12B, 13A, and 13B.

Figure 12A:
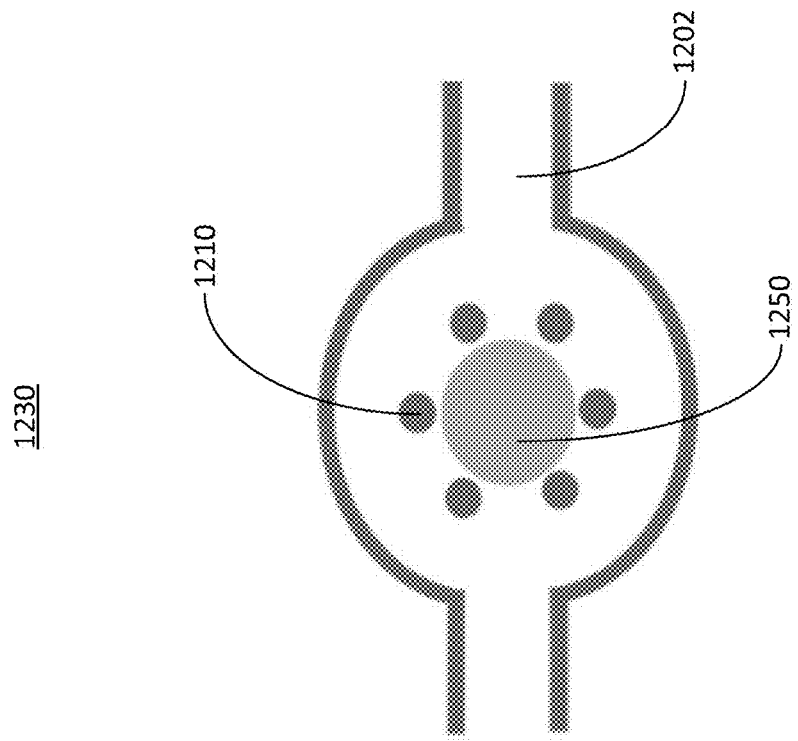
FIGS. 12A and 12B show various views of a channel having a mechanical trapping feature, in accordance with one or more implementations.

Referring now to FIG. 12A, a cross-sectional view 1200 of a portion of a channel 1202 having a mechanical trapping feature is shown. In some implementations, the channel 1202 can be similar to the basal channel 202 shown in FIGS. 4A and 4B. In some other implementations, the channel 1202 can be part of a single-layer microenvironment unit. The channel 1202 includes a mechanical trapping feature that can help to secure a tissue sample 1250, which can be similar to the tissue sample 450 shown in FIG. 4B, within the channel 1202. In this example, the mechanical trapping feature includes a series of raised vertical posts 1210 within the channel 1202 that surround a tissue trapping area to secure the tissue sample 1250 within the tissue trapping area. For illustrative clarity, not every post 1210 is labeled with a reference numeral in FIGS. 12A and 12B. The raised posts 1210 extend vertically between a floor and a ceiling of the channel 1202 to prevent the tissue sample 1250 from moving out of the tissue trapping area when fluid is flowed through the channel 1202. In the example of FIG. 12A, fluid can flow left to right in the channel 1202 in the direction shown by the arrows. Because of the spaces between the posts 1210, fluid can be permitted to flow through the tissue trapping area in the channel 1202, which allows the fluid to interact with the tissue sample 1250. In some implementations, the posts 1210 can have thin profiles, as shown, which may allow for improved fluid flow characteristics in the channel 1202 relative to other mechanical trapping features, such as constructions of the channel 1202.

Figure 12B:
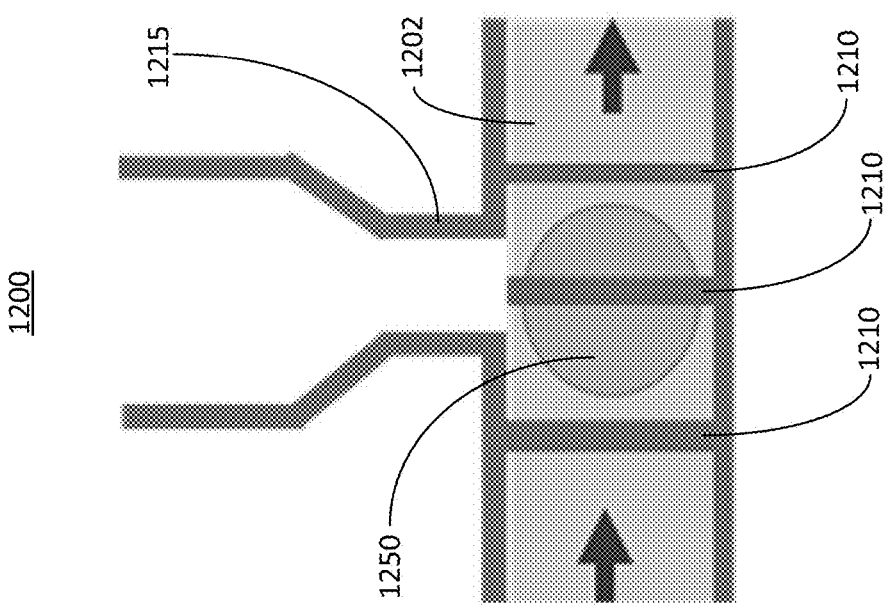

FIG. 12B shows a top down view 1230 of the portion of the channel 1202 shown in FIG. 12A. As shown, the mechanical trapping feature can include six posts 1210. However it should be understood that the precise number, shape, and arrangement of the posts 1210 shown in FIGS. 12A and 12B is illustrative only. For example, while FIG. 12B shows six posts 1210 arranged in a radially symmetric configuration, the mechanical trapping feature could instead include more or fewer posts 1210 than depicted, and the arrangement of the posts 1210 could be altered as well. In some implementations, the spacing between the posts 1210 can be selected to be smaller than a diameter of the tissue sample 1250. Such a spacing can help to ensure that the tissue sample 1250 is kept within the tissue trapping area defined by the posts 1210, and is not permitted to escape by moving between adjacent posts 1210. In some implementations, the posts 1210 can have circular cross-sectional shapes as depicted. In some other implementations, the posts 1210 can have other shapes, such as triangular, rectangular, hexagonal, or other geometric cross-sectional shapes.

Referring again to FIG. 12A, the posts 1210 can extend between a floor and a ceiling of the channel 1202. In some implementations, the posts 1210 may be mechanically coupled with either or both of the floor or the ceiling of the channel 1202. In some implementations, the posts 1210 may not extend the full distance between the ceiling and the floor of the channel 1202. For example, the posts 1210 can be coupled with the floor of the channel 1202, but may not extend all the way to the ceiling of the channel 1202, such that there is a gap between an end of the posts 1210 and the ceiling of the channel 1202. Likewise, in some implementations, the posts 1210 can be coupled with the ceiling of the channel 1202, but may not extend all the way to the floor of the channel 1202, such that there is a gap between an end of the posts 1210 and the floor of the channel 1202. In some implementations, some of the posts 1210 can be coupled with the floor of the channel 1202 while other posts 1210 can be coupled with the ceiling.

The channel 1202 can be coupled with a port 1215, as shown in FIG. 12A. The port 1215 can be used to introduce the tissue sample 1250 into the channel 1202. Thus, the tissue sample 1250 is introduced from above the channel 1202, rather than into an inlet of the channel 1202 in which fluid flow through the channel 1202 carries the tissue sample toward the mechanical trapping feature. In some implementations, the port 1215 can be similar to one of the ports 304 of the multiwell plate 300 shown in FIG. 3. The port 1215 can also serve as an access point for retrieving the tissue sample 1250 and removing it from the channel 1202. In some implementations, the channel 1202 can include a ceiling feature that covers at least a portion of the channel 1202 underneath the port 1215 after the tissue sample 1250 has been introduced into the channel 1202. For example, such a ceiling feature can serve to prevent fluid from leaking out of the channel 1202 through the port 1215 during operation of the device. In some implementations, such a ceiling may be configured to be removed to allow the tissue sample 1250 to be retrieved from the channel 1202 via the port 1215 at a later time.

Referring now to FIG. 13A, a cross-sectional view 1300 of a portion of a channel 1302 having a mechanical trapping feature is shown. In some implementations, the channel 1302 can be similar to the basal channel 202 shown in FIGS. 4A and 4B. In some other implementations, the channel 1302 can be part of a single-layer microenvironment unit. The channel 1302 includes a mechanical trapping feature that can help to secure a tissue sample 1350, which can be similar to the tissue sample 450 shown in FIG. 4B, within the channel 1302. In this example, the mechanical trapping feature includes a series of horizontal structures 1310 within the channel 1302 that surround a tissue trapping area to secure the tissue sample 1350 within the tissue trapping area. For illustrative clarity, not every horizontal structure 1310 is labeled with a reference numeral in FIGS. 13A and 13B. Each horizontal structure 1310 extends inward from a sidewall of the channel 1302, rather than vertically between a floor and a ceiling of the channel 1302, as depicted in FIGS. 12A and 12B. Together, the horizontal structures 1310 can prevent the tissue sample 1350 from moving out of the tissue trapping area when fluid is flowed through the channel 1302. In the example of FIG. 13A, fluid can flow left to right in the channel 1302 in the direction shown by the arrows. Because of the spaces between the horizontal structures 1310, fluid can be permitted to flow through the tissue trapping area in the channel 1302, which allows the fluid to interact with the tissue sample 1350. In some implementations, the horizontal structures 1310 can have thin profiles, as shown, which may allow for improved fluid flow characteristics in the channel 1302 relative to other mechanical trapping features, such as constructions of the channel 1302.

FIG. 13B shows a top down view 1330 of the portion of the channel 1302 shown in FIG. 13A. As shown, the mechanical trapping feature can include six sets of horizontal structures 1310 arranged in columns, and each column can include four horizontal structures 1310. However it should be understood that the precise number, shape, and arrangement of the horizontal structures 1310 shown in FIGS. 13A and 13B is illustrative only. For example, while FIG. 13B shows six sets of horizontal structures 1310 arranged in a radially symmetric configuration, the mechanical trapping feature could instead include more or fewer sets of horizontal structures 1310 than depicted, and the arrangement of the horizontal structures 1310 could be altered as well. In some implementations, the spacing between the horizontal structures 1310 can be selected to be smaller than a diameter of the tissue sample 1350. Such a spacing can help to ensure that the tissue sample 1350 is kept within the tissue trapping area defined by the horizontal structures 1310, and is not permitted to escape by moving between adjacent horizontal structures 1310. In some implementations, the horizontal structures 1310 can have rectangular cross-sectional shapes as depicted. In some other implementations, the horizontal structures 1310 can have other shapes, such as circular, triangular, hexagonal, or other geometric cross-sectional shapes.

The horizontal structures 1310 can project inwards toward an interior of the channel 1302 from a sidewall of the channel 1302. In some implementations, the horizontal structures 1310 may be mechanically coupled with the sidewall of the channel 1302. In some implementations, opposing horizontal structures 1310 do not extend to span the full distance between their respective sidewalls of the channel 1302. As a result, a gap remains in the interior space defined by the ends of the horizontal structures 1310, and this gap can define the tissue trapping area in which the tissue sample 1350 becomes trapped. Thus, in some implementations, each horizontal structure can extend less than 50% of the distance between the opposing sidewalls of the channel 1302. For example, in some implementations each horizontal structure 1310 can extend 10%, 20%, 30%, or 40% of the distance between the opposing sidewalls of the channel 1302. In some implementations, some of the horizontal structures 1310 can have different lengths than others. The shape, size, and arrangement of the horizontal structures 1310 need not be uniform as shown in FIGS. 13A and 13B.

The channel 1302 can be coupled with a port 1315, as shown in FIG. 13A. The port 1315 can be used to introduce the tissue sample 1350 into the channel 1302. Thus, the tissue sample 1350 is introduced from above the channel 1302, rather than into an inlet of the channel 1302 in which fluid flow through the channel 1302 carries the tissue sample toward the mechanical trapping feature. In some implementations, the port 1315 can be similar to one of the ports 304 of the multiwell plate 300 shown in FIG. 3. The port 1315 can also serve as an access point for retrieving the tissue sample 1350 and removing it from the channel 1302. In some implementations, the channel 1302 can include a ceiling feature that covers at least a portion of the channel 1302 underneath the port 1315 after the tissue sample 1350 has been introduced into the channel 1302. For example, such a ceiling feature can serve to prevent fluid from leaking out of the channel 1302 through the port 1315 during operation of the device. In some implementations, such a ceiling may be configured to be removed to allow the tissue sample 1350 to be retrieved from the channel 1302 via the port 1315 at a later time.

Figure 14:
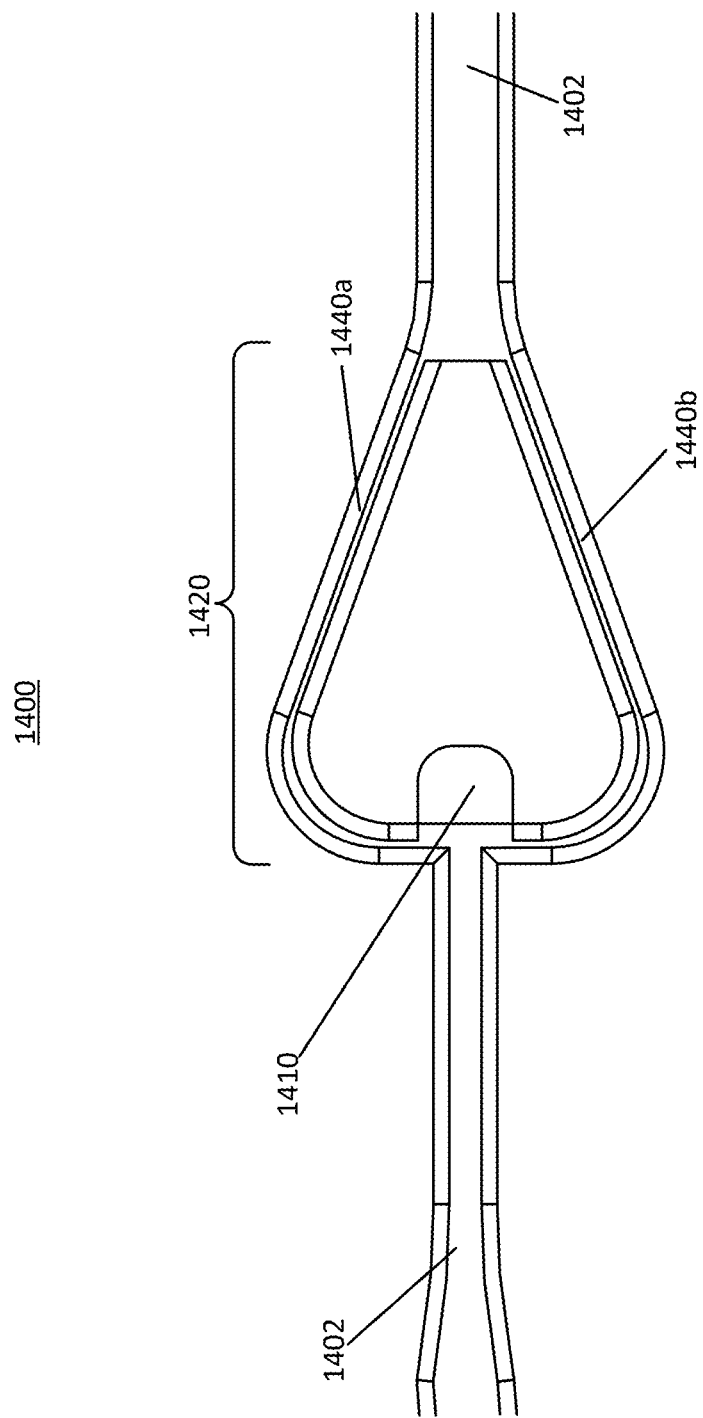
FIG. 14 shows a cross-sectional view of a channel having a mechanical trapping feature, in accordance with one or more implementations.

FIG. 14 shows a cross-sectional view 1400 of a portion of a channel 1402 having a mechanical trapping feature. In some implementations, the channel 1402 can be similar to the basal channel 202 shown in FIGS. 4A and 4B. In some other implementations, the channel 1402 can be part of a single-layer microenvironment unit. The channel 1402 includes a mechanical trapping feature that can help to secure a tissue sample similar to the tissue sample 450 shown in FIG. 4B, within the channel 1402. In this example, the mechanical trapping feature includes a tissue trapping region 1420 having a geometry selected to trap the tissue sample with a tissue trap 1410 as the tissue moves from an upstream portion of the channel 1402 (e.g., the left-hand side of the channel 1402 shown in FIG. 14) toward a downstream portion of the channel 1402 (e.g., the right-hand side of the channel 1402 shown in FIG. 14). The tissue trapping region 1420 also includes two branch channels 1440a and 1440b branching off from the upstream portion of the channel 1402 in opposing directions at a junction near the tissue trap 1410.

The tissue trapping region 1420 is configured to trap a tissue sample in a fixed location while a fluid sample is flowed through the channel 1402. For example, in some implementations, the tissue trapping region 1420 is shaped such that, when the fluid sample flows through the channel 1402, a stagnation zone exists in at least a portion of the area of the tissue trap 1410, causing the tissue sample to become trapped in the tissue trap 1410. In operation, the tissue sample can become trapped in the tissue trap 1410 in a manner that allows the fluid sample to continue flowing through the upstream portion of the channel 1402 to the branch channels 1440a and 1440b, while a portion of the fluid sample contacts the tissue sample in the tissue trap 1410 as it flows.

In some implementations, the tissue trap or trapping zone 1410 can have a bottom wall that is positioned at a lower depth than the bottom of the upstream portion of the channel 1402 that leads up to it. That is, the tissue trap 1410 can be stepped down relative to the bottom surface of the upstream portion of the channel 1402. Thus, the tissue trap 1410 can serve as a pocket for catching, trapping, holding, immobilizing, or securing the tissue sample. In some implementations, the shape of the tissue trapping region 1420, including the tissue trap 1410, is selected to catch or otherwise facilitate trapping of the tissue sample while the fluid sample passes through the channel 1402. For example, the tissue trap 1410 can have a diameter that is larger than that of the inlet upstream portion of the channel 1402. In some implementations, the tissue trap 1410 can have a diameter that is about twice that of the upstream portion of the channel 1402 that leads up to the tissue trap 1410.

The trapping of the tissue sample in a manner that allows the fluid sample to continue flowing through the device while contacting the tissue sample can allow the interactions between the tissue sample and agents within the fluid sample to be evaluated, as described above. For example, in some implementations fluorescent materials can be added to either the fluid sample or the tissue sample, and the visual characteristics of the tissue sample and the fluid sample can be observed over time. To facilitate such observation, the microfluidic device that includes the channel 1402 can be formed from a material that is transparent and optically clear, at least in the region of the device near the tissue trap 1410. This area can serve as an optical interface that can be examined by an optical instrument, such as a camera or a microscope, which is brought into proximity with the microfluidic device. It should be understood that such an optical interface can also be included in microfluidic devices that include any of the mechanical trapping features described above to allow observation of a tissue sample that is trapped by the mechanical trapping features.

Figure 15:
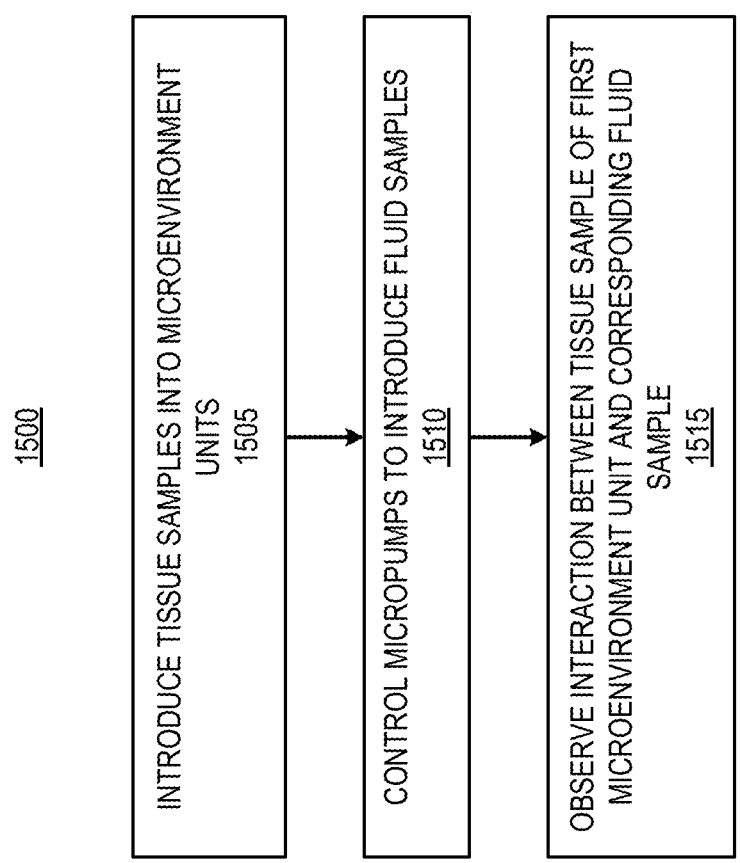
FIG. 15 shows a flowchart of a method for evaluating an interaction between a tissue sample and a fluid sample, in accordance with one or more implementations.

FIG. 15 shows a flowchart of a method 1500 for evaluating an interaction between a tissue sample and a fluid sample. The method 1500 can include introducing tissue samples into microenvironment units of a microfluidic device (BLOCK 1505). In some implementations, the microfluidic device can be or can include a multiwell plate, similar to the multiwell plate 100 shown in FIG. 1. Each well can be coupled with a microenvironment unit similar to the microenvironment unit 102. In some implementations, introducing the tissue samples can include introducing a respective tissue sample into each microenvironment unit of the microfluidic device.

As described above, each microenvironment unit can include a basal compartment and an apical compartment. A membrane can separate the basal compartment from the apical compartment in each microenvironment unit. Each microenvironment unit can also include a mechanical trapping feature. For example, the mechanical trapping feature can be positioned within the basal compartment. In some implementations, the mechanical trapping feature can be defined by a portion of at least one of a sidewall or a floor of the basal compartment. The mechanical trapping feature can be configured to restrict movement of the tissue sample in the basal compartment and to allow fluid to flow past the tissue sample. For example, the mechanical trapping feature can be any of the mechanical trapping features shown and described in connection with FIGS. 4A, 4B, 5-8, 9A-9D, 10, and 11. In some implementations, the mechanical trapping feature can include a combination of any of those mechanical trapping features, which may be included together in a single microenvironment unit. The tissue samples can be introduced by injecting the tissue samples into the microenvironment units via respective wells. In some implementations, the tissue samples can include individual tumors, which may be either animal or human. Such tumors can be broken into fragments from which at least some tissue samples can be introduced into the wells of the multiwell plate system. Other tissue fragments may be used, for example, as a source for immune cells obtained via digestion of the sample.

The method 1500 can include controlling a plurality of micropumps to introduce fluid samples into the microfluidic device (BLOCK 1510). In some implementations, each of the micropumps can be coupled with a respective well of the plurality of wells of the microfluidic device. Thus, controlling the micropumps can allow for a respective fluid sample to be introduced into each respective well. In some implementations, each well can be fluidically coupled with at least one of the plurality of microenvironment units. In some implementations, the fluid samples can include therapeutic substances, such as candidate immunotherapies whose efficacies are to be evaluated.

In some implementations, the micropumps may be used to perfuse the trapped tissue samples with the candidate immunotherapies, which can afford a competitive advantage over traditional systems by significantly extending the duration of viable function of the tissue sample as compared to static systems. In addition, tissue samples perfused according to the techniques of this disclosure can be exposed to a dynamic microenvironment in which nutrients from flowing media are continually introduced to the tissue samples, waste products are continually removed, and the concentration of soluble factors and drugs can be controlled and maintained in a dynamic fashion. The pumping action of the micropumps can be made steady, or can be pulsed or varied in a time-dependent manner. Drug dosing and gradients of soluble factors and bioactive molecules can be controlled using micropumps in an individually targeted manner. In some implementations, individual micropumps can be used to address each well. In some other implementations, groups of wells can be addressed by a single micropump. In some implementations, the micropumps can be integrated pumps rather than external laboratory pumps that are used to drive flow through and past the tissue traps in each well. For example, the micropumps can be integrated with the multiwell plate.

In some implementations, the method 1500 can include controlling at least one micropump of the plurality of micropumps to introduce a second fluid sample into the apical compartment of the first microenvironment unit. For example, the second fluid sample can include a plurality of cells. In some implementations, controlling the plurality of micropumps can include controlling at least two of the micropumps independently from one another. Controlling the micropumps of the systems described can be performed using a controller, such as the controller described herein below. The controller can be communicatively coupled (e.g., via one or more electric traces, wires, or connections, etc.) to one or more of the components of the systems described herein, such as the system 1600, the system 1700, the system 1800, or the system 1900, among others. The controller can be communicatively coupled with one or more of the microfluidic pumps 1610, the valves 1715a and 1715b, the pump 1710, the valve 1815a and a second valve 1815b, the pressure sources of the system 1800, the agitator 1910, or any combination thereof, among others. The controller can transmit or provide one or more signals to the valves (e.g., the valves 1715a and 1715b, the valve 1815a, the second valve 1815b, etc.) as described herein to cause the valves to open or close in accordance with the implementations described herein. The controller can transmit or provide signals to the pumps (e.g., each of the pumps 1610 individually, the pump 1710, etc.) that cause the pumps to move fluid throughout the systems described herein. For example, the controller can cause the microfluidic pumps 1610 to either provide or remove fluid from one or more microenvironment units via a port or a sipper, as described herein.

The controller can be in communication with more than one component simultaneously, and can control each component independently from other components with which the controller communicates. For example, each of the pumps 1610 can be controlled individually to cause, for example, fluids to flow over a tissue sample that has been trapped in a trapping region in a microenvironment unit. Thus, the controller can transmit or provide independent signals to one or more of the components in the systems described herein, allowing the components of the systems to work independently to achieve a desired outcome. In some implementations, the controller can provide or transmit signals over one or more communication buses, such as a serial bus, a parallel bus, or any other type of communication bus. The processor of the controller can be communicatively coupled to one or more communication buses. The components of the systems described herein can be communicatively coupled to one or more of the communication buses, and which can transport signals from the processor of the controller to a respective component. For example, in a serial bus arrangement, the controller can communicate with a particular component by using an address value assigned to that component (e.g., each component on a bus can be assigned an address value, etc.). In a parallel bus arrangement, one or more transmission lines in the parallel bus can be communicatively coupled to a respective component. Thus, controlling the micropumps using the controller (e.g., via providing one or more instructions to the controller that cause the controller to provide signals to the pumps, etc.) can cause fluid to flow through the systems described herein in a desired manner. As described herein, the pumps can be coupled to one or more reservoirs or fluid sources, and thus can be used to provide fluids to other portions of the system, such as the microenvironment units described herein.

The method 1500 can include observing an interaction between the tissue sample of a first microenvironment unit and a corresponding fluid sample (BLOCK 1515). In some implementations, the corresponding fluid sample can be a fluid sample introduced into a first well of the plurality of wells that is coupled with the first microenvironment unit. In some implementations, observing the interaction can include optically imaging the interaction, either with the human eye or by using optical equipment such as a microscope. For example, in some implementations at least a portion of the multiwell plate can include a transparent material. Observing the interaction between the tissue sample of the first microenvironment unit and the fluid sample introduced into the first well can include positioning a lens of a microscope in proximity to the first microenvironment unit and observing the interaction through the transparent material. In some implementations, the transparent material can include an optical layer that is coupled with the multiwell plate.

Figure 16:
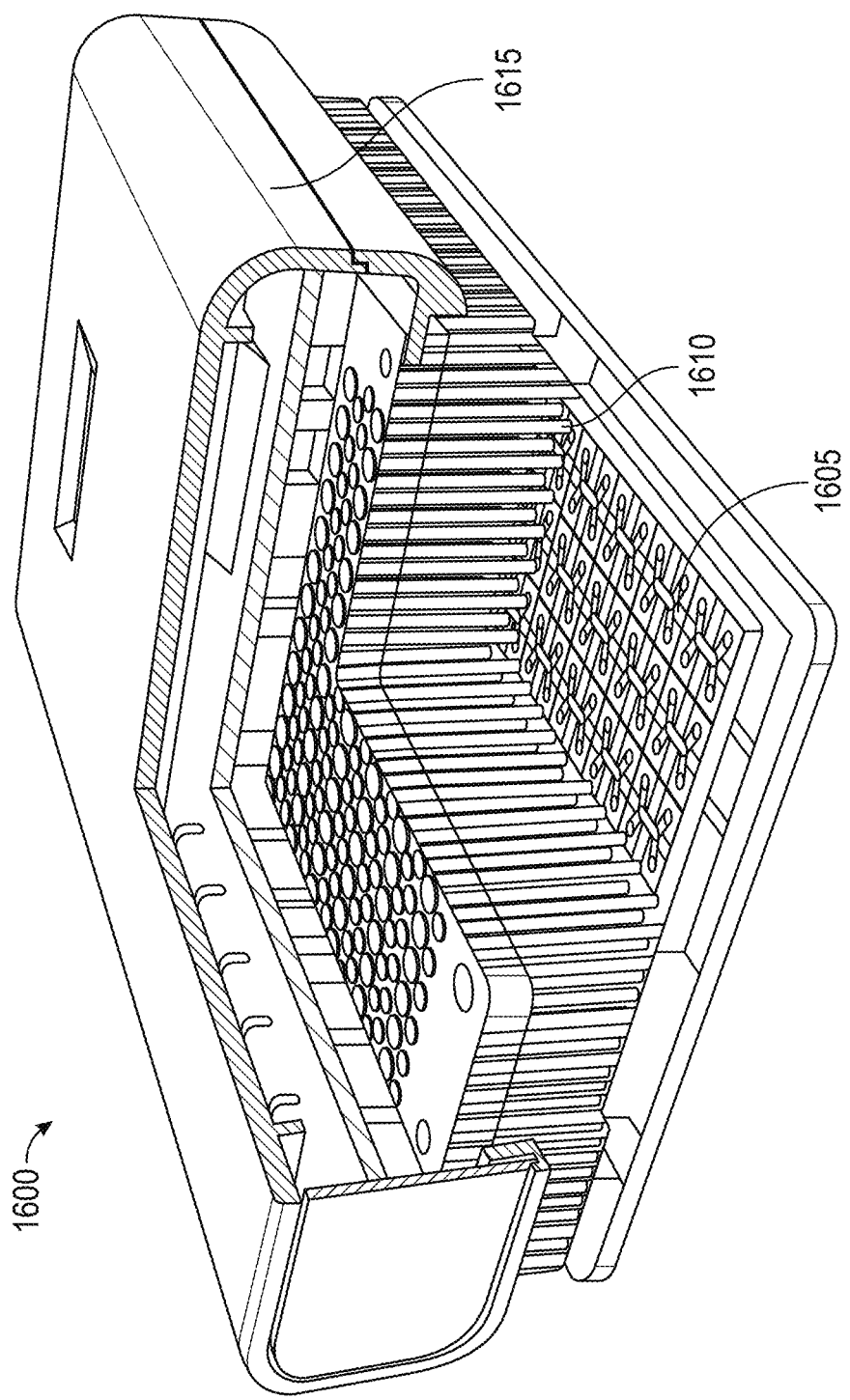
FIG. 16 illustrates a sectional view of an example system for integrating micropumps with a microfluidic device, in accordance with one or more implementations.

FIG. 16 illustrates a sectional view of an example system 1600 for integrating micropumps with a microfluidic device. The system 1600 can include a housing 1615. The housing 1615 can be an enclosure that surrounds or partially surrounds other components of the system 1600. The system 1600 can include a multiwell plate 1605. The well plate 1605 can include a plurality of wells, which may be interconnected by a network of channels within the well plate 1605. In some implementations, the multiwell plate 1605 can be the same as or similar to the multiwell plate 100 shown in FIG. 1.

The system 1600 can also include a series of microfluidic pumps 1610 (sometimes referred to herein as "micropumps"). Each pump 1610 can be coupled with a respective port defined by the well plate 1605. Thus, the pumps 1610 can control the introduction of fluid samples into the wells of the well plate 1605 via the ports with which the pumps 1610 are coupled. In some implementations, the system 1600 may also include additional or different components than those depicted in FIG. 16. For example, the system 1600 can include associated electronic components to control the pumps 1610, such as a controller (not pictured). At least some of these electronic components can be enclosed within the housing 1615. For example, the electronic components can be positioned above the pumps 1610 inside the housing 1615.

The controller can be integrated with one or more of the systems described herein, including the system 1600, the system 1700, the system 1800, or the system 1900. The controller can include at least one processor and at least one memory or other computer-readable storage medium, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The controller can be communicatively coupled (e.g., via one or more electric traces, wires, or connections, etc.) to one or more of the components of the systems described herein, such as the system 1600, the system 1700, the system 1800, or the system 1900, among others. The controller can be communicatively coupled with one or more of the microfluidic pumps 1610, the valves 1715a and 1715b, the pump 1710, the valve 1815a and a second valve 1815b, the pressure sources of the system 1800, the agitator 1910, or any combination thereof, among others. The controller can transmit or provide one or more signals to the valves (e.g., the valves 1715a and 1715b, the valve 1815a, the second valve 1815b, etc.) as described herein to cause the valves to open or close in accordance with the implementations described herein. The controller can transmit or provide signals to the pumps (e.g., each of the pumps 1610 individually, the pump 1710, etc.) that cause the pumps to move fluid throughout the systems described herein. For example, the controller can cause the microfluidic pumps 1610 to either provide or remove fluid from one or more microenvironment units via a port or a sipper, as described herein.

The controller can transmit one or more signals to a motor that causes the agitator 1910 to actuate according to the implementations described herein. For example, the controller can provide one or more signals that indicate a rotation speed (e.g., a serial packet signal, a pulse-width modulation signal, an analog voltage signal, etc.) to a motor that causes the motor to rotate the agitator 1910. Likewise, the controller can transmit one or more similar signals to the valves (e.g., the valves 1715a and 1715b, the valve 1815a, the second valve 1815b, etc.) of the systems described herein to cause the valves to open or close by varying degrees. For example, the controller can transmit or provide one or more signals to one or more of the valves that indicate an amount by which the valves should open or close. The signals can be, for example, serial packet signals, pulse-width modulation signals, pulse-frequency modulation signals, or analog voltage signals, among others. The controller can transmit signals to the pumps (e.g., each of the pumps 1610 individually, the pump 1710, etc.) described herein that cause the pumps to transport specified amounts of fluid through one or more of the systems described herein. For example, the controller can provide a signal to at least one of the pumps that indicates an amount of fluid to pump. In some implementations, the signal provided by the controller can indicate a direction (e.g., pump into a well, pump out of a well, etc.) that particular pump should transport fluid.

The controller can be in communication with more than one component simultaneously, and can control each component independently from other components with which the controller communicates. For example, each of the pumps 1610 can be controlled individually to cause, for example, fluids to flow over a tissue sample that has been trapped in a trapping region in a microenvironment unit. Thus, the controller can transmit or provide independent signals to one or more of the components in the systems described herein, allowing the components of the systems to work independently to achieve a desired outcome. In some implementations, the controller can provide or transmit signals over one or more communication buses, such as a serial bus, a parallel bus, or any other type of communication bus. The processor of the controller can be communicatively coupled to one or more communication buses. The components of the systems described herein can be communicatively coupled to one or more of the communication buses, and which can transport signals from the processor of the controller to a respective component. For example, in a serial bus arrangement, the controller can communicate with a particular component by using an address value assigned to that component (e.g., each component on a bus can be assigned an address value, etc.). In a parallel bus arrangement, one or more transmission lines in the parallel bus can be communicatively coupled to a respective component.

Figure 17:
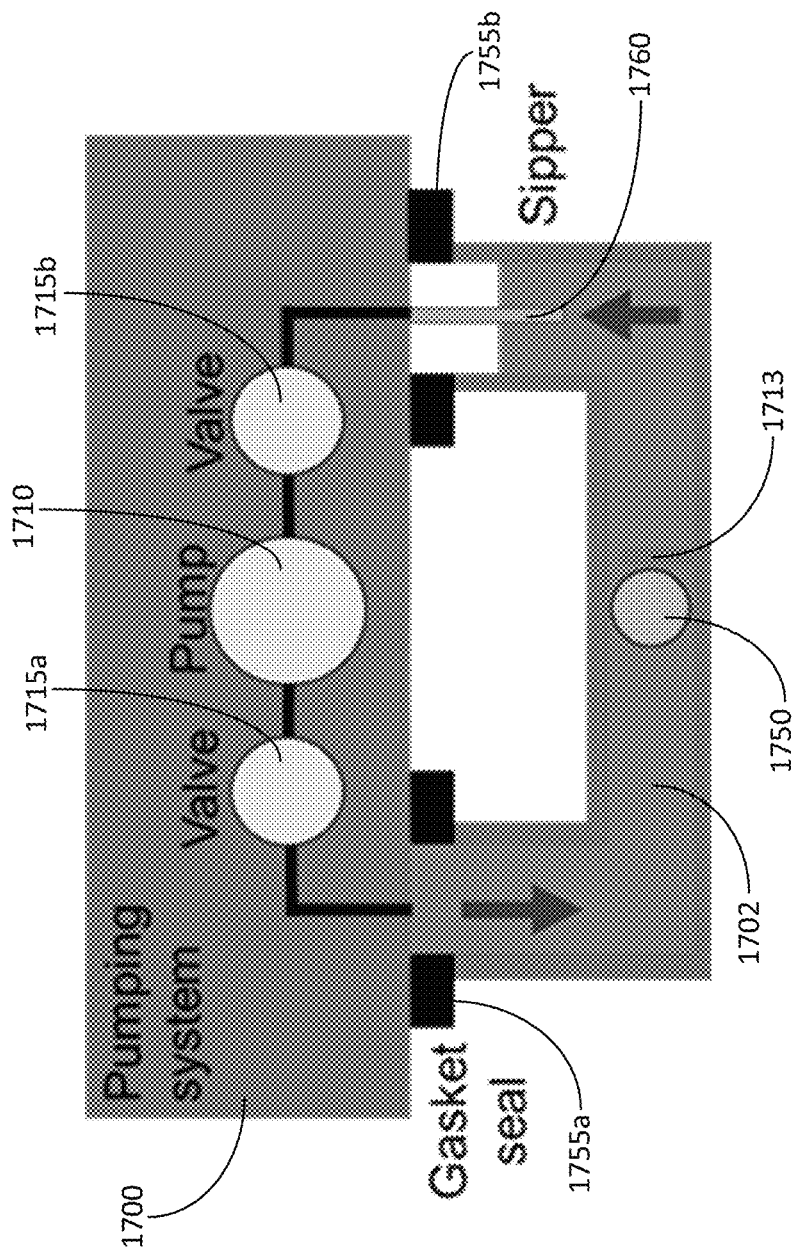
FIG. 17 shows a cross-sectional view of an example pumping system, in accordance with one or more implementations.

FIG. 17 shows a cross-sectional view of an example pumping system 1700. In some implementations, the pumping system 1700 can be implemented in connection with the system 1600 shown in FIG. 16. The pumping system 1700 includes a pump 1710 positioned in a series arrangement between two valves 1715a and 1715b. The pumping system 1700 is coupled with a channel 1702. Fluid flows through the channel 1702 in the direction illustrated by the arrows. For example, an outlet of the pumping system 1700 (e.g., coupled with the valve 1715a) can introduce fluid into an inlet of the channel 1702, while an inlet of the pumping system 1700 (e.g., coupled with the valve 1715) can receive fluid from an outlet of the channel 1702.

The channel 1702 includes a mechanical trapping feature 1713 that traps a tissue sample 1750 within the channel 1702. In this example, the mechanical trapping feature 1713 is depicted as including a post or partial wall that extends vertically from a floor of the channel 1702. However, it should be understood that the mechanical trapping feature 1713 could instead be implemented using a different type of trapping feature or structure, such as any of the mechanical trapping features described above, without departing from the scope of this disclosure. The mechanical trapping feature 1713 and the trapped tissue sample 1750 partially occlude the channel 1702. In order to flow fluid through the channel 1702, the pumping system 1700 can be configured to supply enough pressure while the channel 1702 is partially occluded. For example, gaskets 1755a and 1755b can be included to form seals at the points where the channel 1702 couples with the pumping system 1700. These seals can allow the pump 1710 to build sufficient pressure to flow fluid through the channel 1702.

In some implementations, in order to move fluid through the channel 1702, the valve 1715a can be opened and the valve 1715b can be closed while the pump 1710 exerts pressure to drive fluid towards the inlet of the channel 1702 (e.g., towards the left-hand side in FIG. 17). As a result, fluid can flow towards, around, and through the fluid sample 1750 toward an outlet of the channel 1702. The pumping system 1700 can also include a sipper 1760 that is partially submerged in a downstream portion of the channel 1702 near the outlet. In some implementations, the valve 1715a can be closed, the valve 1715b can be opened, and the pump 1710 can retrieve fluid from the channel 1702 via the sipper 1760. Then, the pumping cycle can be repeated.

Figure 18:
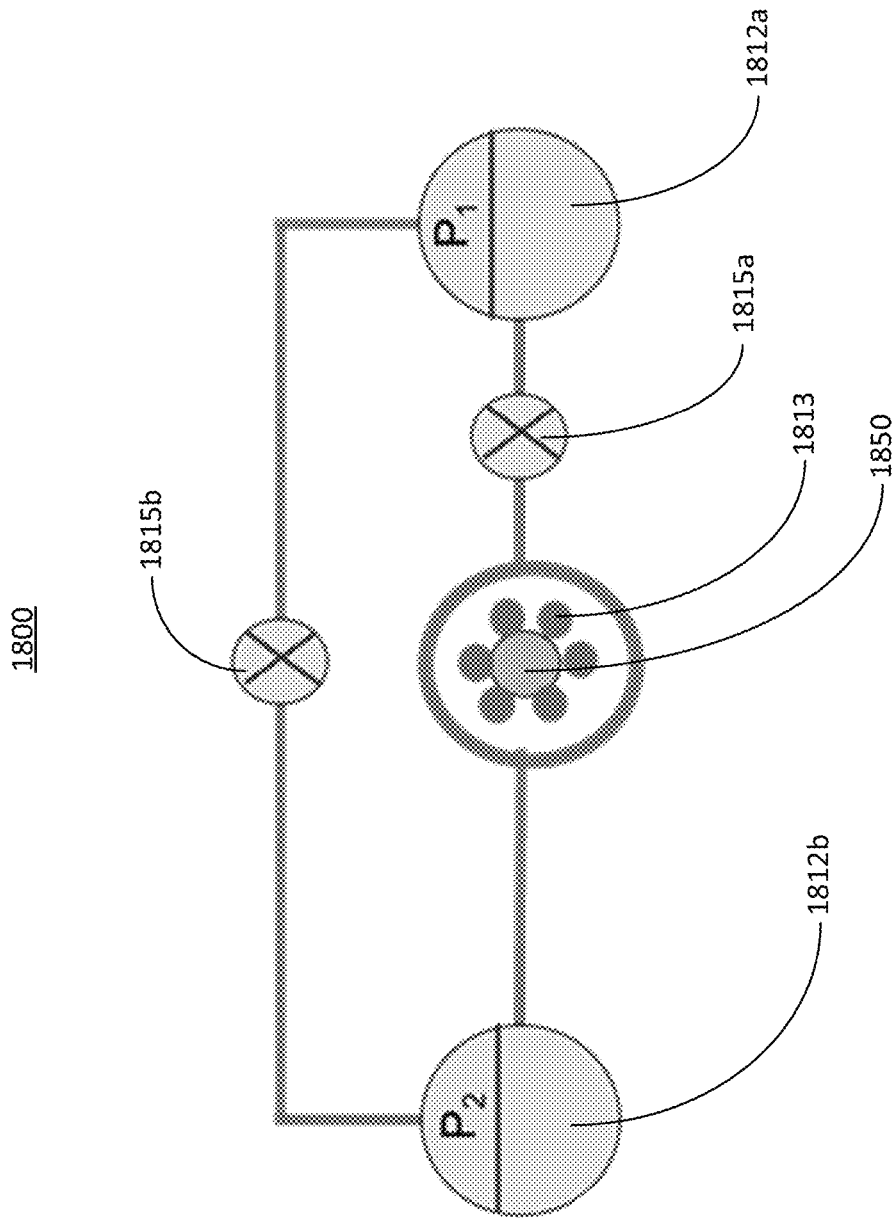
FIG. 18 shows a schematic view of an example pumping system, in accordance with one or more implementations.

FIG. 18 shows a schematic view of an example pumping system 1800. In some implementations, the pumping system 1800 can be implemented in connection with the system 1600 shown in FIG. 16. The pumping system 1800 includes two reservoirs 1812a and 1812b positioned on either side of a mechanical trapping feature 1813. In some implementations, the reservoirs 1812a and 1812b can be on-chip reservoirs that are part of a multiwell plate that includes a microenvironment in which the mechanical trapping feature 1813 is positioned. The reservoirs 1812a and 1812b can each be coupled with a pressure source that causes a pressure labeled P1 in the reservoir 1812a and a pressure labeled P2 in the reservoir 1812b. For example, the pressure source can be a pneumatic line directly coupled with either or both of the reservoirs 1812a and 1812b. In some implementations, the pressure source may be coupled with either or both of the reservoirs 1812a and 1812b through a distensible membrane that serves as a diaphragm separating the liquid and gas phase.

The pumping system 1800 also includes a first valve 1815a and a second valve 1815b. Together, the valves 1815a and 1815b can allow for selection of the fluid flow path through the mechanical trapping feature 1813. For example, when the pressure P2 of the reservoir 1812b is greater than the pressure P1 of the reservoir 1812a, the valve 1815a can be opened and the valve 1815b can be closed to cause fluid to flow from the reservoir 1812b through the mechanical trapping feature 1813 and to the reservoir 1812a (e.g., towards the right-hand side in the depiction of FIG. 18). Eventually, this fluid flow can deplete the fluid in the reservoir 1812b. Prior to this depletion, the valve 1815a can be closed and the valve 1815b can be opened, and the pressure differential between the reservoirs 1812a and 1812b can be reserved such that the pressure P1 of the reservoir 1812a is greater than the pressure P2 of the reservoir 1812b. As a result, fluid can be returned from the reservoir 1812a to the reservoir 1815b via the valve 1815b, thereby enabling fluid to be recirculated.

It should be understood that, in this example, the mechanical trapping feature 1813 is depicted as including a set of posts arranged to trap the tissue sample 1850, similar to the posts 1210 of FIGS. 12A and 12B. However, it should be understood that the mechanical trapping feature 1813 could instead be implemented using a different type of trapping feature or structure, such as any of the mechanical trapping features described above, without departing from the scope of this disclosure.

Figure 19:
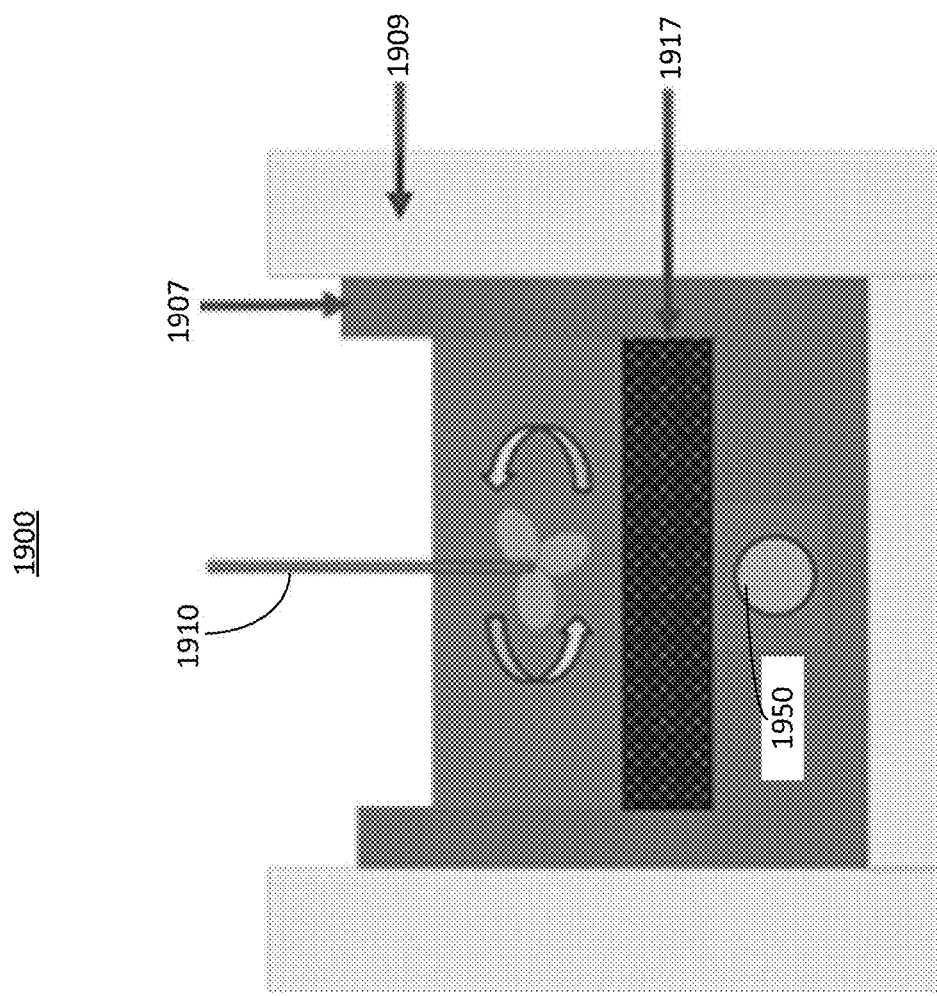
FIG. 19 shows a cross-sectional view of an example pumping system, in accordance with one or more implementations.

FIG. 19 shows a cross-sectional view of an example pumping system 1900. In some implementations, the pumping system 1900 can be implemented in connection with the system 1600 shown in FIG. 16. The pumping system 1900 includes an agitator 1910. The agitator can be inserted into a well of a multiwell plate, such as the multiwell plate 300 shown in FIG. 3. In the example of FIG. 19, the well is defined by a well insert 1907 that is disposed in a well plate 1909, however it should be understood that other arrangements are also possible. The agitator 1910 is positioned above a tissue trapping region of the well insert 1907, in which a tissue sample 1950 is trapped. For example, the tissue sample 1950 can be trapped by any of the mechanical trapping features described above. A permeable substrate 1917 can be positioned between the agitator 1910 and the tissue sample 1950. In some implementations, the permeable substrate 1917 can include a mesh, a membrane, or a porous plate. The permeable substrate 1917 can be supported by a portion of the well insert 1907.

The tissue sample 1950 can be introduced into the well defined by the well insert 1907 for example via a microfluidic channel or by deposition into a cavity of the well. A fluid sample can be added to the well, and the agitator 1910 can be activated. For example, in some implementations the agitator can be or can include a propeller, a magnetic stir bar, or a set of spinning cones coupled with a rotating shaft that spins in the direction shown by the arrows in FIG. 19. The agitation of the fluid sample by the agitator 1910 can cause at least a portion of the fluid to be pushed through the permeable substrate 1917 and to interact with the tissue sample 1950.

The agitator 1910 can have a surface geometry selected to promote agitation and/or mixing of the fluid sample when the agitator 1910 is activated. The surface geometry of the agitator can also be selected to mimic various physiological conditions in the interaction between the fluid sample and the tissue sample 1950. For example, spinning cones or other surfaces can be selected or designed to provide shear, interstitial pressure, and other conditions that may exist in a physiological environment (e.g., a patient) to be treated. As a result, the design of the agitator 1910 can help to increase the utility of experimental results obtained by causing and observing an interaction between the fluid sample and the tissue sample 1950 in implementations in which the interaction is observed for the purposes of identifying or evaluating a candidate therapeutic substance contained within the fluid sample Implementations of some of the subject matter and the operations described in this specification, for example, those related to the controller described herein above, can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices, any other storage media described herein, etc.).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

As used herein, the terms "about" and "substantially" will be understood by persons of ordinary skill in the art and will vary to some extent depending upon the context in which they are used. If there are uses of the term which are not clear to persons of ordinary skill in the art given the context in which it is used, "about" will mean up to plus or minus 10% of the particular term.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A microfluidic device, comprising:
a well plate comprising a plurality of wells, the well plate defining a plurality of microenvironment units fluidically coupled with the plurality of wells, each microenvironment unit comprising:
one or more compartments; and
a trapping feature positioned within a compartment of the one or more compartments, the trapping feature extending from a floor of the compartment and configured to trap a tissue sample introduced into the one or more compartments between a top surface of the trapping feature and a ceiling of the compartment, and to allow fluid to flow through the compartment at least between the tissue sample and the floor of the compartment; and
a plurality of micropumps each configured to control movement of a fluid sample through a respective well of the plurality of wells.

2. The microfluidic device of claim 1, wherein the one or more compartments of each microenvironment unit comprise a basal compartment, an apical compartment, and a membrane separating the basal compartment from the apical compartment; and wherein each microenvironment unit further comprises:
a basal channel having a basal channel inlet and a basal channel outlet, wherein the basal compartment comprises a portion of the basal channel between the basal channel inlet and the basal channel outlet; and
an apical channel having an apical channel inlet and an apical channel outlet, wherein the apical compartment comprises a portion of the apical channel between the apical channel inlet and the apical channel outlet.

3. The microfluidic device of claim 2, wherein the plurality of micropumps comprises at least a first micropump fluidically coupled with the basal compartment of a first microenvironment unit of the plurality of microenvironment units via a first well and a second micropump coupled with the apical compartment of the first microenvironment unit via a second well.

4. The microfluidic device of claim 2, wherein the membrane comprises an apical surface and a basal surface, opposite the apical surface, the membrane further comprising a functionalized coating applied to a floor of the basal compartment.

5. The microfluidic device of claim 4, wherein the functionalized coating comprises a gel.

6. The microfluidic device of claim 1, wherein at least one micropump of the plurality of micropumps is coupled with at least two wells of the plurality of wells.

7. The microfluidic device of claim 1, further comprising a fluid reservoir coupled with at least one micropump of the plurality of micropumps.

8. The microfluidic device of claim 1, further comprising a controller communicatively coupled with each micropump of the plurality of micropumps, the controller configured to selectively control each micropump of the plurality of micropumps independently.

9. The microfluidic device of claim 1, further comprising a transparent optical layer coupled with the well plate, the transparent optical layer providing an optical interface into each microenvironment unit of the well plate, wherein the optical interface has a thickness selected to permit the tissue sample in each microenvironment unit to be observed using a confocal microscope.

10. The microfluidic device of claim 1, wherein the trapping feature of the at least one microenvironment unit comprises a plurality of raised surfaces extending from the floor of the one or more compartments into the one or more compartments.

11. The microfluidic device of claim 10, wherein each of the plurality of raised surfaces are positioned on the floor of the one or more compartments in an arrangement that exhibits symmetry about a longitudinal axis of the one or more compartments.

12. The microfluidic device of claim 10, wherein at least one of the plurality of raised surfaces has a curved shape.

* * * * *